United States Patent
Yamamoto et al.

(10) Patent No.: US 6,263,281 B1
(45) Date of Patent: Jul. 17, 2001

(54) GPS POSITIONING APPARATUS, GPS POSITIONING METHOD AND COMPUTER READABLE RECORDING MEDIUM ON WHICH GPS POSITIONING PROGRAM IS RECORDED

(75) Inventors: Yousuke Yamamoto; Masaru Yambe, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/502,441

(22) Filed: Feb. 11, 2000

(30) Foreign Application Priority Data

Apr. 22, 1999 (JP) .................................................. 11-114509

(51) Int. Cl.⁷ .................................................... H04B 7/185
(52) U.S. Cl. ...................... 701/215; 701/214; 342/357.02
(58) Field of Search .................................... 701/213, 207, 701/214, 215; 342/357.02, 357.03, 357.06, 357.08

(56) References Cited

U.S. PATENT DOCUMENTS

| | | | |
|---|---|---|---|
| 5,831,516 | * 11/1998 | Shegnblat | 701/215 |
| 5,841,398 | * 11/1998 | Brock | 701/215 |
| 6,052,081 | * 4/2000 | Krasher | 342/357.02 |
| 6,191,730 | * 2/2001 | Nelson, Jr. | 701/214 |
| 6,198,989 | * 3/2001 | Tankhilevich et al. | 342/357.06 |

FOREIGN PATENT DOCUMENTS

87006713 * 11/1987 (WO) ............................. 701/215

* cited by examiner

*Primary Examiner*—Richard M. Camby
(74) *Attorney, Agent, or Firm*—Staas & Halsey, LLP

(57) ABSTRACT

A GPS positioning apparatus includes an input section which inputs known point position information, approximation section which approximates pieces of pseudo distance information acquired at a known point by a GPS receiver as coefficient information, and a positioning processor which acquires a plurality of pseudo distances at an unknown point from the GPS receiver and predicts a plurality of pseudo distance prediction values at the known point on the basis of the coefficient information. The positioning processor calculates the position of the unknown point from the known point position information, the plurality of pseudo distances at the unknown point and the plurality of pseudo distance prediction values.

9 Claims, 9 Drawing Sheets

GPS POSITIONING APPARATUS, GPS POSITIONING METHOD AND COMPUTER READABLE RECORDING MEDIUM ON WHICH GPS POSITIONING PROGRAM IS RECORDED

FIELD OF THE INVENTION

The present invention relates to a GPS positioning apparatus and method for measuring the position (three-dimensional coordinates (latitude, longitude and height) of an unknown point on the basis of signals transmitted from a plurality of GPS (Global Positioning System) satellites, and a computer readable recording medium on which a GPS positioning program is recorded.

BACKGROUND OF THE INVENTION

As the positioning methods, the hyperbolic navigation methods represented by the methods such as the Loran C navigation method or the omega navigation method were popularly used in ships or airplanes. However, the GPS positioning method is becoming popular and wide-spread because of its very high positioning accuracy. Positioning by the GPS is a technique in which radio waves output from a plurality of GPS satellites are received by a GPS receiver to measure the distance between the respective GPS satellite and the GPS receiver and to calculate the position of the GPS receiver (user). This technique is the core technique for satellite navigation methods for not only ships or airplanes but also automobiles.

However, in this positioning method there is a problem that the radio waves get delayed in the troposphere and the ionized layer. Further, there is an intentional degradation called SA (Selective Availability) generated by the Department of Defense of the U.S.A. in order to intentionally degrade the accuracy in view of the national defense strategies. Because of these problems, in a single positioning method which performs positioning utilizing only one GPS positioning apparatus, a positioning accuracy is about 100 m. At this 100-m-order positioning accuracy, in particular, some problems are posed when a ship enters a harbor or when the GPS is used as a car navigation system in urban areas.

In recent years, a relative positioning method (differential method or an interference positioning method) which uses the following technique has started attracting the attention. In this method, the observation error component generated by the single positioning method is canceled by using information sent from a reference station installed at a known point and observation information at a mobile station thereby improving the positioning accuracy.

The GPS is a positioning system constituted by 24 GPS satellites which fly in a circular orbit having a height of about 20,000 km. The GPS began to be developed by the Department of Defense in United States of America in 1970s to be used by the military and other alliance. This GPS is a system which can singularly perform positioning at a high accuracy on the sea and the land, i.e., in any area on the earth, and has replaced the conventional hyperbolic navigation methods such as the omega navigation method, the Loran C navigation method, and the Decca navigation method. A part of the signals from the GPS satellites have been made open to the public under certain conditions. Some signals from this part are used as positioning information in the car navigation or the like.

At present, the methods which use the GPS to perform positioning are roughly classified into two methods and both of them use GPS positioning apparatuses:

(1) Single positioning method
(2) Relative positioning method

The single positioning method mentioned above is the most basic positioning method. In this positioning method, at least four GPS satellites are simultaneously observed by a GPS positioning apparatus at an unknown point. On the basis of these four observation results, a total of four unknowns (latitude, longitude, height and clock error), i.e., unknown three-dimensional coordinates (latitude, longitude and height) and a clock error in the GPS positioning apparatus are obtained. More specifically, the GPS positioning apparatus calculates correlations between received signals (C/A codes) from the GPS satellites while the GPS positioning apparatus sequentially generates C/A codes (Clear and Acquisition) codes allocated to the GPS satellites to calculate propagation delay times. The C/A code is open to the public, and is a pseudo noise code having a code length of 1023 bits.

The GPS positioning apparatus then calculates pseudo distance up to the respective GPS satellite by multiplying the propagation delay times by the velocity of light. The pseudo distance is the sum of a true distance and an error distance between the GPS positioning apparatus and the satellite. Clock error, error of orbit information of the GPS satellite, fluctuation generated by the SA to the C/A code, propagation delay caused by the ionized layer, and propagation delay caused by the troposphere are generally the factors that generate an error in the measurement of the distance.

The GPS positioning apparatus obtains position information of each satellite from Ephemeris (satellite orbit information) included in a satellite message from each GPS satellite, and solves quaternary simultaneous equations (positioning equations) on the basis of the position information and the pseudo distance described above, thereby calculating the coordinates $(X_u, Y_u, Z_u)$ of an unknown point and a clock error $(C_{BU})$. The quaternary simultaneous equations are expressed by the following equation (1):

$$(X_i-X_u)^2+(Y_i-Y_u)^2+(Z_i-Z_u)^2=(R_i-C_{BU})^2 \tag{1}$$

wherein i (i=1, 2, 3, 4) represents a GPS satellite used in positioning, $X_i$, $Y_i$ and $Z_i$ are coordinates (known) of the GPS satellite, $X_u$, $Y_u$ and $Z_u$ are the positioning coordinates (unknown) of the GPS positioning apparatus, $R_i$ is the pseudo distance between the GPS positioning apparatus and the GPS satellite (known), and $C_{BU}$ is the clock error.

In this manner, in the single positioning method, the coordinates $(X_u, Y_u, Z_u)$ of an unknown point are calculated as positioning results. However, the positioning results include an error of orbit information of the GPS satellite described above, the error caused by a fluctuation generated intentionally by the SA to the C/A code, delay error caused by the ionized layer, and the error component based on a delay caused by the troposphere. Therefore, the positioning accuracy of the single positioning method is limited to about 100 m.

The relative positioning method of the item (2) is a method which performs positioning by using a plurality of GPS positioning apparatuses (a GPS positioning apparatus at a known point and a GPS positioning apparatus at an unknown point), and can perform positioning at an accuracy higher than that of the single positioning method of the item (1). The relative positioning methods are roughly classified into a differential method and an interference positioning method. The differential method is also called a DGPS (Differential GPS). According to the differential method, the GPS positioning apparatus at the known point and the GPS positioning apparatus at the unknown point perform single positioning using a pseudo distance to cancel a common error, thereby improving a positioning accuracy to several meters.

On the other hand, according to the interference positioning method, after the GPS positioning apparatus at the known point and the GPS positioning apparatus at the unknown point measure the phases (to be referred to as carrier wave phases hereinafter) of carrier waves from the GPS satellites, a base vector between the known point and the unknown point is calculated. Using this base vector, the relative three-dimensional coordinates of the known point with respect to the known point are calculated. Since this interference positioning method uses a carrier wave having a wavelength of about 20 cm, a resolution higher than that of the differential method using a C/A code having a wavelength of about 300 m is obtained. Thus, there is the advantage that the positioning accuracy is considerably improved.

A rough configuration of a GPS positioning system which uses the differential method and the interference positioning method will be described below with reference to FIG. 7. The GPS satellites 1A, 1B, 1C and 1D shown in FIG. 7 are the four GPS satellites out of the 24 GPS satellites, and are visible satellites which can be simultaneously observed from both of a known point and an unknown point. The known point is a known fixed point expressed by correct three-dimensional coordinates (latitude, longitude and height). On the other hand, the unknown point is a point whose position is to be obtained. This unknown point corresponds to the three-dimensional coordinates of a moving object (e.g. a car) 4 which changes it position at every moment.

The GPS satellites 1A, 1B, 1C and 1D always transmit signals required for positioning with carrier waves. In the GPS, two types of carrier waves for positioning are used, and the carrier waves are called L1 band (1575.42 MHz) and L2 band (1227.6 MHz), respectively. Two types of signals for positioning on the carrier waves of the L1 band and the L2 band are used, and the signals are called C/A code and P code, respectively. The C/A code is a code for positioning opening to the public, and has a code length of 1023 bits.

On the other hand, the P code is a code which is concealed for military use, and has a code length of about $6 \times 10^{12}$ bits. The C/A code and the P code are called pseudo noise codes (PN code (Pseudo random Noise code)), and are digital codes each of which is constituted by irregularly ordering 0 and 1 at a glance. As array patterns of the PN codes, different array patterns are allocated to the 24 GPS satellites. The GPS satellites are identified by the different array patterns.

A C/A code and a satellite message are on the carrier wave of the L1 band, and only P code is on the carrier wave of the L2 band. The satellite message consists of a data group including satellite orbit information or the like required for a positioning calculation, and is digital data having a bit rate lower than those of the C/A code and the P code. More specifically, the satellite message includes satellite orbit information, coarse orbit information of all the GPS satellites, an ionized layer correction coefficient, a correction coefficient of a satellite clock (atomic clock) and the like.

A known point side GPS positioning apparatus 2 is installed at the known point, and receives radio waves from the GPS satellites 1A, 1B, 1C and 1D through a not shown GPS antenna to calculate a GPS observation amount. The known point side GPS positioning apparatus 2 is installed in a not shown reference station installed at the known point. In this case, when the differential method is used, the GPS observation amount is the pseudo distances from the known point side GPS positioning apparatus 2 up to the GPS satellites 1A, 1B, 1C and 1D.

In the differential method, the known point side GPS positioning apparatus 2 applies the three-dimensional coordinates of the GPS satellites 1A, 1B, 1C and 1D obtained by the satellite massage and the three-dimensional coordinates of the known point to the Pythagoras theorem to calculate a geometrical distance (theoretical value). Further, the known point side GPS positioning apparatus 2 calculates a difference between the geometrical distance and the pseudo distance as a correction amount, and calculates a change rate of the correction amount with time. The correction amount and the change rate thereof are calculated with respect to the GPS satellites 1A, 1B, 1C and 1D.

The correction amount is an amount corresponding to an error of orbit information of an error component (an error of orbit information of a GPS satellite, part of an error caused by fluctuation given to a code by the SA, a propagation delay error caused by the ionized layer, and a propagation delay error caused by the troposphere) of positioning results obtained by the single positioning method. The known point side GPS positioning apparatus 2 transmits the correction amounts (differences) corresponding to the GPS satellites 1A, 1B, 1C and 1D and change rates of the correction amounts to a relaying station 3 (to be described later) as DGPS data.

On the other hand, in the interference positioning method, GPS observation amounts are carrier wave phases corresponding to the GPS satellites 1A, 1B, 1C and 1D in the known point side GPS positioning apparatus 2. In this case, the known point side GPS positioning apparatus 2 transmits the carrier wave phases and the three-dimensional coordinates of the known point to the relaying station 3 as interference positioning data.

The relaying station 3 is a station which transmits relays data (DGPS data or interference positioning data) to an unknown point side GPS positioning apparatus 5 mounted on the moving object 4. The relaying station 3 and the known point side GPS positioning apparatus 2 are connected to each other through a cable circuit (or radio circuit), and the relaying station 3 and the unknown point side GPS positioning apparatus 5 are connected to each other through a radio circuit.

Here, as the relaying station 3, for example, an FM (Frequency Modulation) broadcast station is used. In this case, data (DGPS data or interference positioning data) from the known point side GPS positioning apparatus 2 is got on an FM broadcast radio wave, and is broadcasted through an antenna 3a. As the antenna 3a, in addition to the FM broadcast station, a radio station for only the GPS, a medium wave beacon, a communication satellite, a navigation satellite or the like is used.

The moving object 4 has the unknown point side GPS positioning apparatus 5 mounted thereon. While the moving object 4 moves, the position (three dimensional coordinates) of the moving object 4 changes every moment. The unknown point side GPS positioning apparatus 5, like the known point side GPS positioning apparatus 2, receives radio waves from the GPS satellites 1A, 1B, 1C and 1D through a GPS antenna (not shown), respectively, so as to calculate GPS observation amounts.

More specifically, in the differential method, the unknown point side GPS positioning apparatus 5 calculates pseudo distances between the unknown point side GPS positioning apparatus 5 and the GPS satellites 1A, 1B, 1C and 1D. The unknown point side GPS positioning apparatus 5 subtracts a correction amount obtained by the DGPS data from the respective pseudo distances. With this subtraction, common error components (an error of orbit information of a GPS satellite, part of an error caused by fluctuation given to a code by the SA, a propagation delay error caused by the ionized layer, and a propagation delay error caused by the troposphere) of error components at the known point and the unknown point is canceled.

Next, the unknown point side GPS positioning apparatus 5 obtains position information of the satellites from Ephemeris (satellite orbit information) included in a satellite message from the GPS satellites 1A, 1B, 1C and 1D. The unknown point side GPS positioning apparatus 5, as in the single positioning method described above, solves quaternary simultaneous equations (positioning equations) on the basis of the position information and the subtraction results described above (distances from which the common errors are removed), thereby calculating the position (three-dimensional coordinates) of the unknown point. The details of the positioning method in this differential method will be described later with reference to FIG. 8.

On the other hand, in the interference positioning method, the unknown point side GPS positioning apparatus 5 calculates a path difference between radio waves from the same GPS satellite to the known point side GPS positioning apparatus 2 and the unknown point side GPS positioning apparatus 5 on the basis of the carrier wave phases corresponding to the GPS satellites 1A, 1B, 1C and 1D and the data (interference positioning data) from the relaying station 3. In fact, the path differences are calculated for the GPS satellites 1A, 1B, 1C and 1D, respectively.

The unknown point side GPS positioning apparatus 5 calculates a base vector from the known point to the unknown point on the basis of these path differences to obtain the position (three-dimensional coordinates) of the unknown point with respect to the known point. The details of the positioning method in the interference positioning method will be described below with reference to FIG. 9. In this manner, in the conventional differential method and the conventional interference positioning method, the relaying station 3 for relaying the data from the known point side GPS positioning apparatus 2 to the unknown point side GPS positioning apparatus 5 is necessary.

The positioning method in the differential method and the interference positioning method will be described below with reference to FIG. 8 and FIG. 9. The same reference numerals as in FIG. 7 denote the same parts in FIG. 8 and FIG. 9. First, the positioning method in the differential method will be described below with reference to FIG. 8.

In FIG. 8, the known point side GPS positioning apparatus 2 installed at the known point, as in the single positioning method described above, receives radio waves from the GPS satellites 1A, 1B, 1C and 1D through a not shown GPS antenna to calculate pseudo distances $O_1$, $O_2$, $O_3$ and $O_4$. These pseudo distances $O_1$, $O_2$, $O_3$ and $O_4$ include the clock error described above, error of orbit information of a GPS satellite, part of the error caused by fluctuation given to a code by the SA, propagation delay error caused by the ionized layer, and propagation delay error caused by the troposphere, respectively.

Next, the known point side GPS positioning apparatus 2 calculates geometrical distances as theoretical values $C_1$, $C_2$, $C_3$ and $C_4$ from the three-dimensional coordinates of the GPS satellites 1A, 1B, 1C and 1D and the three-dimensional coordinates of the known point. In addition, the known point side GPS positioning apparatus 2 calculates differences between the calculated pseudo distances $O_1$, $O_2$, $O_3$ and $O_4$ and the theoretical values $C_1$, $C_2$, $C_3$ and $C_4$ as correction amounts (($O_1-C_1$), ($O_2-C_2$), ($O_3-C_3$) and ($O_4-C_4$)), respectively.

The correction amounts described above correspond to the error of orbit information of the GPS satellite, part of an error caused by fluctuation given to a code by the SA, a propagation delay error caused by the ionized layer, and a propagation delay error caused by the troposphere, respectively, and are common error components with respect to the unknown point side GPS positioning apparatus 5. In addition, the known point side GPS positioning apparatus 2 calculates change rates of the correction amounts (($O_1-C_1$), ($O_2-C_2$), ($O_3-C_3$) and ($O_4-C_4$)) with time.

The known point side GPS positioning apparatus 2 transmits the correction amounts (($O_1-C_1$), ($O_2-C_2$), ($O_3-C_3$) and ($O_4-C_4$)) and the change rates of the correction amounts to the relaying station 3. In this manner, DGPS data is transmitted through the antenna 3a of the relaying station 3. The DGPS data is received by the unknown point side GPS positioning apparatus 5.

In parallel to a receiving operation of a radio wave by the known point side GPS positioning apparatus 2, the unknown point side GPS positioning apparatus 5 receives radio waves from the GPS satellites 1A, 1B, 1C and 1D through the GPS antenna (not shown), thereby calculating pseudo distances $O_a$, $O_b$, $O_c$ and $O_d$. The pseudo distances $O_a$, $O_b$, $O_c$ and $O_d$ include the common error components described above.

The unknown point side GPS positioning apparatus 5 obtains the correction amounts (($O_1-C_1$), ($O_2-C_2$), ($O_3-C_3$) and ($O_4-C_4$)) and the change rates thereof from the received DGPS data. In addition, the unknown point side GPS positioning apparatus 5 uses the change rates to extrapolate correction amounts (($O_1-C_1$), ($O_2-C_2$), ($O_3-C_3$) and ($O_4-C_4$)) at reception time of the radio waves from the GPS satellites 1A, 1B, 1C and 1D by extrapolation.

The unknown point side GPS positioning apparatus 5 subtracts the extrapolated correction amounts from the pseudo distances $O_a$, $O_b$, $O_c$ and $O_d$, respectively. The subtraction results are the distances from which the common error components have been removed. In addition, the unknown point side GPS positioning apparatus 5 solves quaternary simultaneous equations (positioning equations) on the basis of the position information of the GPS satellites 1A, 1B, 1C and 1D and the subtraction results described above (distances from which common errors are removed) to calculate the position (three-dimensional coordinates) of the unknown point.

In this manner, on the basis of the DGPS data from the known point side GPS positioning apparatus 2, the common error components included in the pseudo distances $O_a$, $O_b$, $O_c$ and $O_d$ in the unknown point side GPS positioning apparatus 5 are removed. For this reason, the positioning results obtained by the differential method has an accuracy higher than that in the single positioning method.

The positioning method performed by the interference positioning method will be described below with reference to FIG. 9. The interference positioning method shown in FIG. 9 is a method called a real time kinematics method in which positioning results are obtained on real time by using data (interference positioning data) from the relaying station 3. A principles of the real time kinematics method will be described below.

In this real time kinematics method, principally, a difference (path difference PD) between a distance $\rho_a$ from the known point side GPS positioning apparatus 2 to the GPS satellite 1A and a distance $\rho_b$ from the unknown point side GPS positioning apparatus 5 to the same GPS satellite 1A is calculated. Similarly, path differences corresponding to the GPS positioning systems 1B, 1C, and 1D are calculated. In this case, the distances $\rho_a$ and $\rho_b$ and the path differences are calculated on the basis of the phases (carrier wave phases) of the carrier waves from the GPS satellites 1A, 1B, 1C and 1D. On the basis of the four path differences, a base vector D from the known point to the unknown point, in other words, the relative position of the unknown point with respect to the known point is calculated.

More specifically, the three-dimensional coordinates of the known point side GPS positioning apparatus 2 (known point) and the three-dimensional coordinates of the unknown point side GPS positioning apparatus 5 (unknown point) are represented by $(X_a, Y_a, Z_a)$ and $(X_b, Y_b, Z_b)$, and the three-dimensional coordinates of the ith GPS satellite at a moment (GPS satellite 1A in FIG. 9) are represented by $(X_i, Y_i, Z_i)$. The three-dimensional coordinates $(X_a, Y_a, Z_a)$ and $(X_i, Y_i, Z_i)$ are known, and $(X_b, Y_b, Z_b)$ are unknown numbers.

Under these conditions, the distance $\rho_a$ between the ith GPS satellite (GPS satellite 1A in FIG. 9) and known point side GPS positioning apparatus 2 is expressed by the next equation (2) according to the Pythagoras theorem:

$$\rho_a = \{(X_i-X_a)^2+(Y_i-Y_a)^2+(Z_i-Z_a)^2\}^{1/2} \quad (2)$$

Similarly, the distance $\rho_b$ between the ith GPS satellite (GPS satellite 1A) and the unknown point side GPS positioning apparatus 5 is expressed by the following equation (3):

$$\rho_a = \{(X_i-X_b)^2+(Y_i-Y_b)^2+(Z_i-Z_b)^2\}^{1/2} \quad (3)$$

Therefore, the path difference PD is expressed by the following equation (4) on the basis of the equations (2) and (3):

$$PD = \rho_a - \rho_b = \{(X_i-X_a)^2+(Y_i-Y_a)^2+(Z_i-Z_a)^2\}^{1/2} - \{(X_i-X_b)^2+(Y_i-Y_b)^2+(Z_i-Z_b)^2\}^{1/2} \quad (4)$$

The path differences with respect to the remaining GPS positioning systems 1B and 1C are calculated as in the equation (4). As a result, ternary simultaneous equations are derived. The solutions $(X_b, Y_b, Z_b)$ of the ternary simultaneous equations are calculated by using a mathematical method such as linear combination or the method of least squares. The unknown numbers can be mathematically derived on the basis of the three GPS satellites. In fact, however, in order to remove clock error components in the GPS satellites, the known point side GPS positioning apparatus 2 and the unknown point side GPS positioning apparatus 5, derivation of the unknown numbers are performed on the basis of four GPS satellites.

The above is the mathematical positioning principle. In fact, the known point side GPS positioning apparatus 2 receives radio waves from the GPS satellites 1A, 1B, 1C and 1D to observe carrier wave phases $K_1, K_2, K_3$ and $K_4$. In this case, in the carrier wave phases $K_1, K_2, K_3$ and $K_4$, only decimal portions of wave numbers can be understood because the observation results of the known point side GPS positioning apparatus 2 are instantaneous phase values. More specifically, a wave number is expressed by the sum of an integer portion (one wavelength of carrier wave x integer) and the decimal portion. In the observation results, the integer portion is not fixed. This phenomenon is called phase ambiguity or integer bias.

The carrier wave phases $K_1, K_2, K_3$ and $K_4$ include error components consisting of phase ambiguity, a delay error caused by the ionized layer, a propagation delay error caused by the troposphere, a clock error and the like. The known point side GPS positioning apparatus 2 relays the carrier wave phases $K_1, K_2, K_3$ and $K_4$ serving as observation amounts and phase information (three-dimensional coordinates) of the known point to the relaying station 3 as interference positioning data. The interference positioning data is broadcasted by the relaying station 3.

On the other hand, the unknown point side GPS positioning apparatus 5, like the known point side GPS positioning apparatus 2, receives radio waves from the GPS satellites 1A, 1B, 1C and 1D to observe carrier wave phases $K_a, K_b, K_c$ and $K_d$. In this case, the carrier wave phases $K_a, K_b, K_c$ and $K_d$ include error components consisting of phase ambiguity, a propagation delay error caused by the ionized layer, a propagation delay error caused by the troposphere, a clock error and the like.

The unknown point side GPS positioning apparatus 5 receives the interference positioning data from the relaying station 3 to linearly combine the carrier wave phases $K_1, K_2, K_3$ and $K_4$ and the carrier wave phases $K_a, K_b, K_c$ and $K_d$, respectively, as expressed in the following equations (5) to (7), thereby calculating observation values $K_{12ab}, K_{13ac}$ and $K_{14ad}$ on a mathematical model.

$$K_{12ab} = (K_1-K_a)-(K_2-K_b) \quad (5)$$

$$K_{13ac} = (K_1-K_a)-(K_3-K_c) \quad (6)$$

$$K_{14ac} = (K_1-K_a)-(K_4-K_d) \quad (7)$$

When the linear combination is performed as described above, common errors (delay errors or the like caused by the ionized layer) of the known point side GPS positioning apparatus 2 and the unknown point side GPS positioning apparatus 5 are canceled. The unknown point side GPS positioning apparatus 5 arithmetically operates the equations (5) to (7) by using the known method of least squares or a Kalman filter to fix the integer portions of the carrier wave phases, and calculates a base vector $(X_b, Y_b, Z_b)$ from the known point side GPS positioning apparatus 2 (the known point $(X_a, Y_a, Z_a)$ as positioning results. The positioning results are very high accurate because the positioning results are based on the phase of a carrier wave having a wavelength of about 20 cm.

Once the integer portion of the carrier wave phase is fixed, the integer portion need not be calculated unless the integer portion does not change. In order to make it rapid to perform arithmetic operation for fixing the integer portion of the carrier wave phase, it is desired that the number of visible GPS satellites which can be simultaneously seen from the known point side GPS positioning apparatus 2 and the unknown point side GPS positioning apparatus 5 is as large as possible.

In the differential method and the interference positioning method using a plurality of GPS positioning apparatuses, as has been described with reference to FIG. 8 and FIG. 9, at least four visible GPS satellites which can be simultaneously seen from the known point side GPS positioning apparatus 2 and the unknown point side GPS positioning apparatus 5 are required, and it is desired that the distance between the known point side GPS positioning apparatus 2 and the unknown point side GPS positioning apparatus 5 is as short as possible (10 km or less) to keep a high accuracy.

However, in order to satisfy the above condition in a wide area, as in a configuration constituted by a plurality of zones in a mobile telephone network, a large number of known point side GPS positioning apparatuses 2 (reference stations) and a large number of relaying stations 3 have to be installed at intervals of several 10 km. For this reason, installation costs are high. At present, service areas in which the known point side GPS positioning apparatuses 2 (reference stations)

are installed are limited to bigger cities and the like, and the service areas do not reach mountainous regions and non-populated regions. Therefore, since positioning cannot be performed by a method other than the single positioning method in an area except for the service area, accurate positioning results cannot be obtained.

In addition, in the prior art, four or more visible GPS satellites which can be simultaneously seen from the known point side GPS positioning apparatus 2 and the unknown point side GPS positioning apparatus 5 are required. However, in particular, since a receiving location of a radio wave in the unknown point side GPS positioning apparatus 5 mounted on the moving object 4 frequently changes, only three or less visible GPS satellites may be simultaneously seen from the known point side GPS positioning apparatus 2 and the unknown point side GPS positioning apparatus 5. In this case, accurate positioning results cannot be obtained. When a radio circuit between the relaying station 3 and the unknown point side GPS positioning apparatus 5 is disconnected due to the influence of fading or the like, accurate positioning results cannot be obtained.

Furthermore, in the unknown point side GPS positioning apparatus 5, in addition to a receiving unit (antenna and receiving section) for receiving a radio wave from the GPS satellite 1A or the like, other receiving unit (antenna and receiving section) for receiving data from the relaying station 3 are required. The apparatus is increased in size by, especially, the antenna.

SUMMARY OF THE INVENTION

It is an object of this invention to provide a GPS positioning apparatus and method which can perform accurate positioning without a known point side GPS positioning apparatus (reference station) and a relaying station and can reduce the apparatus in size, and a computer readable recording medium on which a GPS positioning program is recorded.

According one aspect of the present invention, an input unit inputs the position information of the known point when a plurality of observation amounts are obtained at the known point and an approximating unit approximates these observation amounts as approximation expressions using a time as a variable. When the apparatus is moved from the known point to the unknown point, a plurality of observation amounts are obtained at the unknown point. At this time, a plurality of observation amounts at the known point are predicted by a predicting unit as a plurality of observation amount prediction values on the basis of the approximation expressions. These plurality of observation amount prediction values correspond to data transmitted from a reference station in the prior art. The position of the unknown point in which an error component is corrected is calculated by a positioning unit on the basis of the position information of the known point and the plurality of observation amount prediction values.

According to the above invention, observation amount prediction values corresponding to data transmitted in a conventional reference station are predicted by the predicting unit, and the position of the unknown point is calculated on the basis of the observation amount prediction values. For this reason, a conventional reference station and a conventional relaying station are not necessary, and positioning can be performed at a high accuracy. In addition, a unit for receiving data from the reference station is not necessary.

According to another aspect of the present invention, when a plurality of pseudo distances are obtained at the known point when the position information of the known point is input by an input unit, these pseudo distances are approximated by an approximating unit as approximation expressions using a time as a variable. When the apparatus is moved from the known point to the unknown point, a plurality of pseudo distances are obtained at the unknown point. At this time, a plurality of pseudo distances at the known point are predicted by a predicting unit as a plurality of pseudo distance prediction values on the basis of the approximation expressions. These plurality of pseudo distance prediction values correspond to DGPS data transmitted from a reference station in the prior art. The position of the unknown point is obtained by a positioning unit on the basis of the position information of the known point, the plurality of pseudo distance prediction values and the like at an accuracy higher than that in a single positioning method.

According to the above invention, pseudo distance prediction values corresponding to DGPS data transmitted in a conventional reference station are predicted by the predicting unit, and the position of the unknown point is calculated by the differential method on the basis of the pseudo distance prediction values. For this reason, a conventional reference station and a conventional relaying station are not necessary, and positioning can be performed at a high accuracy. In addition, a unit for receiving data from the reference station is not necessary.

According to still another aspect of the present invention, when a plurality of carrier wave phases are obtained at the known point when the position information of the known point is input by an input unit, these carrier wave phases are approximated by an approximating unit as approximation expressions using a time as a variable. When the apparatus is moved from the known point to the unknown point, a plurality of carrier wave phases are obtained at the unknown point. At this time, a plurality of carrier wave phases at the known point are predicted by a predicting unit as a plurality of carrier wave phase prediction values on the basis of the approximation expressions. These plurality of carrier wave phase prediction values correspond to interference positioning data transmitted from a reference station in the prior art. The position of the unknown point is obtained by a positioning unit on the basis of the position information of the known point, the plurality of carrier wave phase prediction values and the like at an accuracy higher than that in a differential method.

According to the above invention, carrier wave phase prediction values corresponding to interference positioning data transmitted in a conventional reference station are predicted by the predicting unit, and the position of the unknown point is calculated by the interference positioning method on the basis of the carrier wave phase prediction values. For this reason, a conventional reference station and a conventional relaying station are not necessary, and positioning can be performed at a high accuracy. In addition, a unit for receiving data from the reference station is not necessary.

According to still another aspect of the present invention, when a plurality of observation amounts are obtained at the known point when the position information of the known point is input at an input step, these observation amounts are approximated at an approximating step as approximation expressions using a time as a variable. When the apparatus is moved from the known point to the unknown point, a plurality of observation amounts are obtained at the unknown point. At this time, a plurality of observation amounts at the known point are predicted at a predicting step as a plurality of observation amount prediction values on the basis of the approximation expressions. These plurality of observation amount prediction values correspond to data transmitted from a reference station in the prior art. The position of the unknown point in which an error component is corrected is calculated at a positioning step on the basis of the position information of the known point and the plurality of observation amount prediction values.

According to the above invention, observation amount prediction values corresponding to data transmitted in a conventional reference station are predicted by the predicting step, and the position of the unknown point is calculated on the basis of the observation amount prediction values. For this reason, a conventional reference station and a conventional relaying station are not necessary, and positioning can be performed at a high accuracy. In addition, a unit for receiving data from the reference station is not necessary.

According to still another aspect of the present invention, when a plurality of pseudo distances are obtained at the known point when the position information of the known point is input at an input step, these pseudo distances are approximated at an approximating step as approximation expressions using a time as a variable. When the apparatus is moved from the known point to the unknown point, a plurality of pseudo distances are obtained at the unknown point. At this time, a plurality of pseudo distances at the known point are predicted at a predicting step as a plurality of pseudo distance prediction values on the basis of the approximation expressions. These plurality of pseudo distance prediction values correspond to DGPS data transmitted from a reference station in the prior art. The position of the unknown point is obtained at a positioning step on the basis of the position information of the known point, the plurality of pseudo distance prediction values and the like at an accuracy higher than that in a single positioning method.

According to the above invention, pseudo distance prediction values corresponding to DGPS data transmitted in a conventional reference station are predicted by the predicting step, and the position of the unknown point is calculated by the differential method on the basis of the pseudo distance prediction values. For this reason, a conventional reference station and a conventional relaying station are not necessary, and positioning can be performed at a high accuracy. In addition, in the invention according to the fifth aspect, a unit for receiving data from the reference station is not necessary.

According to still another aspect of the present invention, when a plurality of carrier wave phases are obtained at the known point when the position information of the known point is input at an input step, these carrier wave phases are approximated at an approximating step as approximation expressions using a time as a variable. When the apparatus is moved from the known point to the unknown point, a plurality of carrier wave phases are obtained at the unknown point. At this time, a plurality of carrier wave phases at the known point are predicted at a predicting step as a plurality of carrier wave phase prediction values on the basis of the approximation expressions. These plurality of carrier wave phase prediction values correspond to interference positioning data transmitted from a reference station in the prior art. The position of the unknown point is obtained at a positioning step on the basis of the position information of the known point, the plurality of carrier wave phase prediction values and the like at an accuracy higher than that in a differential method.

According to the above invention, carrier wave phase prediction values corresponding to interference positioning data transmitted in a conventional reference station are predicted by the predicting step, and the position of the unknown point is calculated by the interference positioning method on the basis of the carrier wave phase prediction values. For this reason, a conventional reference station and a conventional relaying station are not necessary, and positioning can be performed at a high accuracy. In addition, a unit for receiving data from the reference station is not necessary.

According to still another aspect of the present invention, when a plurality of observation amounts are obtained at the known point when the position information of the known point is input at an input step, these observation amounts are approximated at an approximating step as approximation expressions using a time as a variable. When the apparatus is moved from the known point to the unknown point, a plurality of observation amounts are obtained at the unknown point. At this time, a plurality of observation amounts at the known point are predicted at a predicting step as a plurality of observation amount prediction values on the basis of the approximation expressions. These plurality of observation amount prediction values correspond to data transmitted from a reference station in the prior art. The position of the unknown point in which an error component is corrected is calculated at a positioning step on the basis of the position information of the known point and the plurality of observation amount prediction values.

According to the above invention, observation amount prediction values corresponding to data transmitted in a conventional reference station are predicted at a predicting step, and the position of the unknown point is calculated on the basis of the observation amount prediction values. For this reason, a conventional reference station and a conventional relaying station are not necessary, and positioning can be performed at a high accuracy. In addition, a unit for receiving data from the reference station is not necessary.

According to still another aspect of the present invention, when a plurality of pseudo distances are obtained at the known point when the position information of the known point is input at an input step, these pseudo distances are approximated at an approximating step as approximation expressions using a time as a variable. When the apparatus is moved from the known point to the unknown point, a plurality of pseudo distances are obtained at the unknown point. At this time, a plurality of pseudo distances at the known point are predicted at a predicting step as a plurality of pseudo distance prediction values on the basis of the approximation expressions. These plurality of pseudo distance prediction values correspond to DGPS data transmitted from a reference station in the prior art. The position of the unknown point is obtained at a positioning step on the basis of the position information of the known point, the plurality of pseudo distance prediction values and the like at an accuracy higher than that in a single positioning method.

According to the above invention, pseudo distance prediction values corresponding to DGPS data transmitted in a conventional reference station are predicted at the predicting step, and the position of the unknown point is calculated by the differential method on the basis of the pseudo distance prediction values. For this reason, a conventional reference station and a conventional relaying station are not necessary, and positioning can be performed at a high accuracy. In addition, a unit for receiving data from the reference station is not necessary.

According to still another aspect of the present invention, when a plurality of carrier wave phases are obtained at the known point when the position information of the known point is input at an input step, these carrier wave phases are approximated at an approximating step as approximation expressions using a time as a variable. When the apparatus is moved from the known point to the unknown point, a plurality of carrier wave phases are obtained at the unknown point. At this time, a plurality of carrier wave phases at the known point are predicted at a predicting step as a plurality of carrier wave phase prediction values on the basis of the approximation expressions. These plurality of carrier wave phase prediction values correspond to interference positioning data transmitted from a reference station in the prior art. The position of the unknown point is obtained at a positioning step on the basis of the position information of the known point, the plurality of carrier wave phase prediction values and the like at an accuracy higher than that in a differential method.

According to the above invention, carrier wave phase prediction values corresponding to interference positioning data transmitted in a conventional reference station are predicted by the predicting step, and the position of the unknown point is calculated by the interference positioning method on the basis of the carrier wave phase prediction values. For this reason, a conventional reference station and a conventional relaying station are not necessary, and positioning can be performed at a high accuracy. In addition, in the invention according to the ninth aspect, a unit for receiving data from the reference station is not necessary.

Other objects and features of this invention will become apparent from the following description with reference to the accompanying drawings.

DESCRIPTION OF THE PREFERRED EMBODIMENTS

An embodiment of a GPS positioning apparatus and method according to the present invention and a computer readable recording medium on which a GPS positioning program is recorded will be described below with reference to the accompanying drawings.

Figure 1:
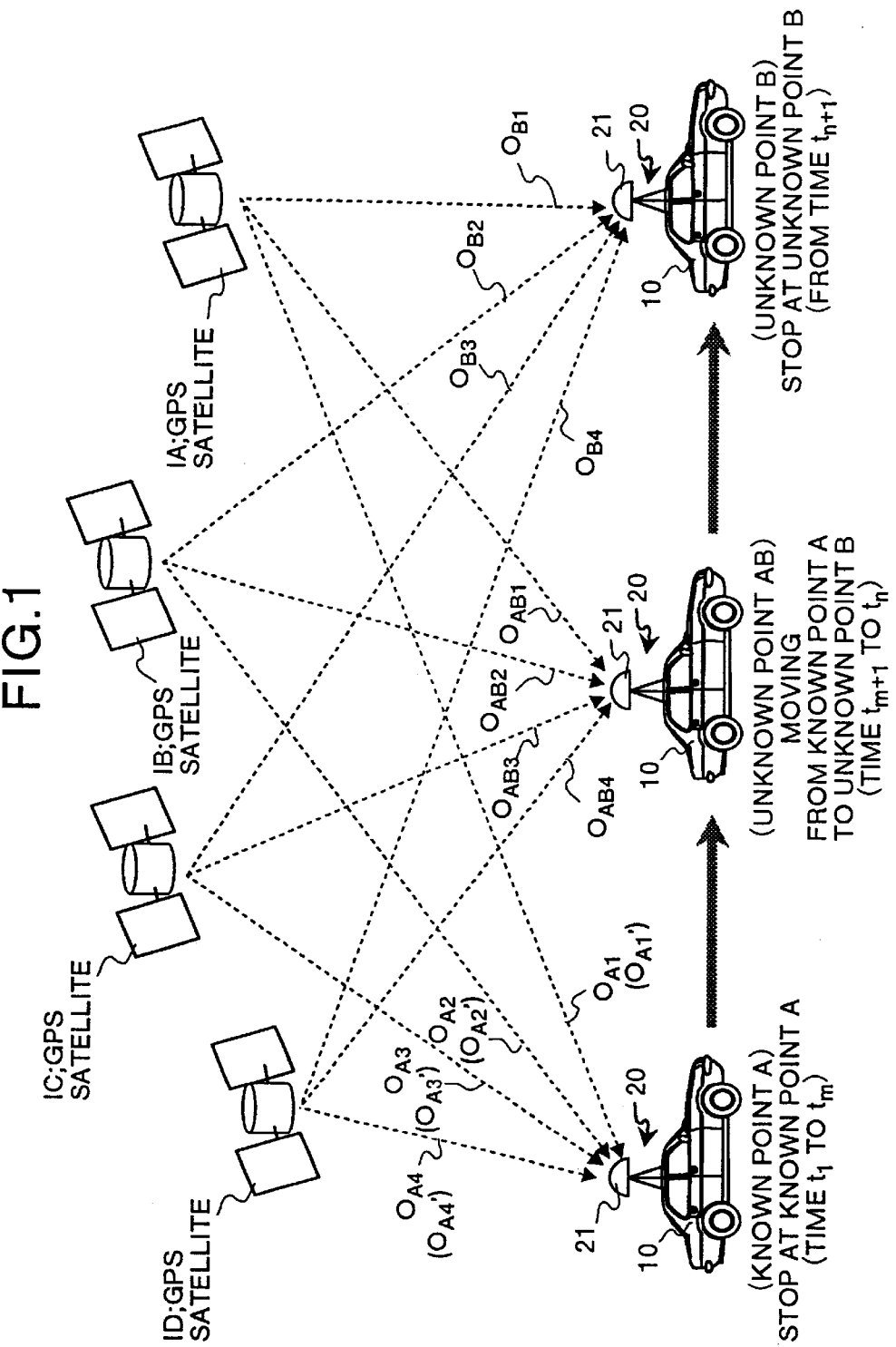
FIG. 1 is a diagram showing a rough configuration of a GPS positioning system when a differential method is used in a GPS positioning apparatus 20 according to an embodiment of the present invention.
Figure 7:
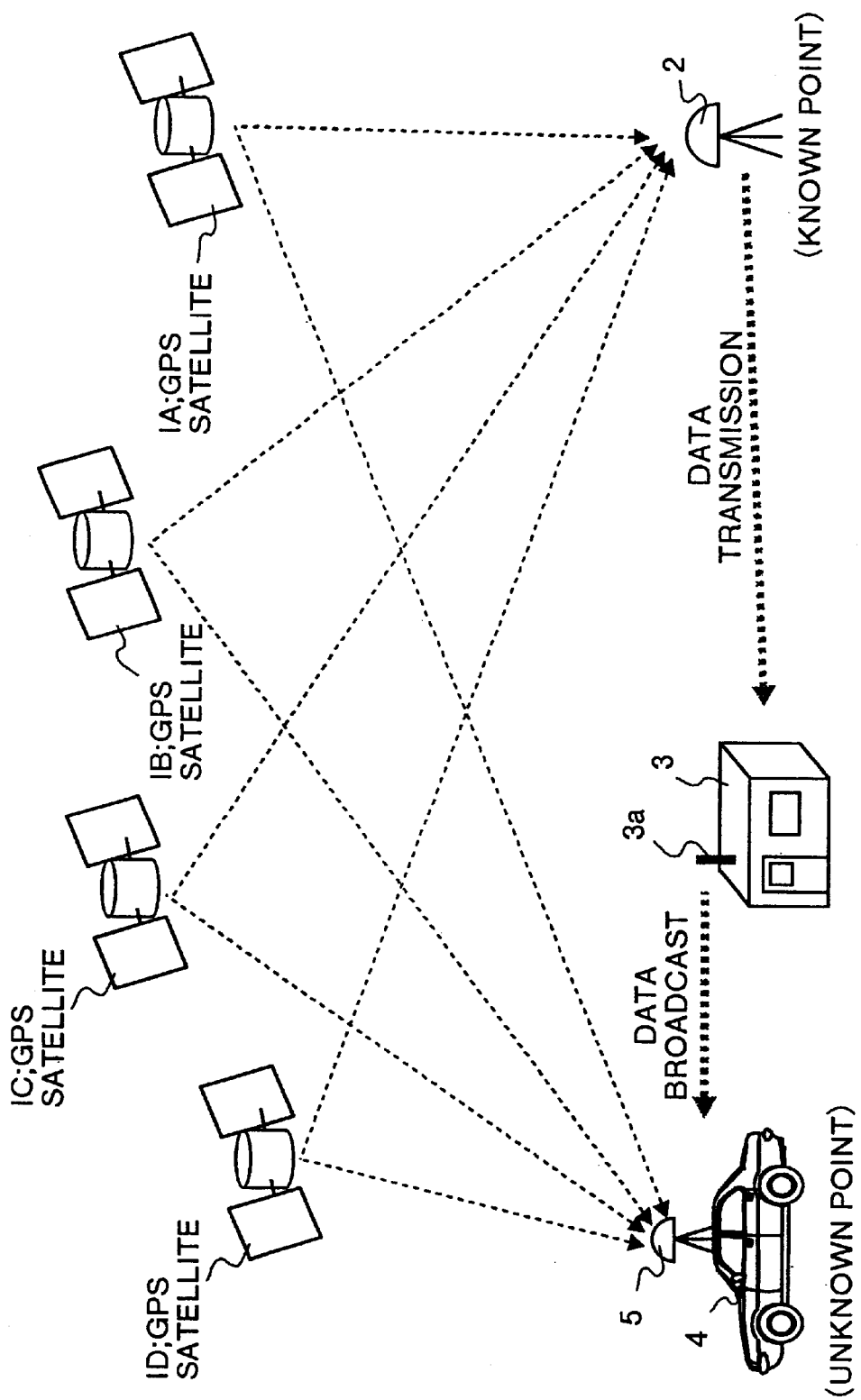
FIG. 7 is a diagram showing a rough configuration of a GPS positioning system in which a conventional GPS positioning apparatus is applied.

FIG. 1 is a diagram showing a rough configuration of a GPS positioning system when a differential method is used in a GPS positioning apparatus 20 according to an embodiment of the present invention. The same reference numerals as in FIG. 7 denote the same sections in FIG. 1. In FIG. 1, the known point side GPS positioning apparatus 2 (reference station) and the relaying station 3 shown in FIG. 7 are not provided, and a moving object 10 and a GPS positioning apparatus 20 are provided in place of the moving object 4 and the unknown point side GPS positioning apparatus 5 shown in FIG. 7.

GPS satellites 1A, 1B, 1C and 1D shown in FIG. 1, as described above, always transmit C/A codes, P codes and the like required for positioning while these codes and the like are got on carrier waves of an L1 band and an L2 band. The GPS positioning apparatus 20 is mounted on the moving object 10, and the moving object 10 moves from a known point A to an unknown point B in FIG. 1. The known point A is a point in which position information consisting of three-dimensional coordinates (latitude, longitude and height) is known. On the other hand, the unknown point B is a point in which three-dimensional coordinates (position) are not known.

The GPS positioning apparatus 20 comprises a GPS antenna 21, and receives radio waves from GPS satellites 1A, 1B, 1C and 1D to position the three-dimensional coordinates (positions) of the unknown point AB during movement of the moving object 10 and the three-dimensional coordinates (position) of the unknown point B. The GPS positioning apparatus 20 can cope with either one of the differential method and the interference positioning method. The case of using the differential method is illustrated in FIG. 1. The details of a positioning operation performed when the differential method is used in the GPS positioning apparatus 20 will be described below with reference to the flowchart shown in FIG. 3.

Figure 2:
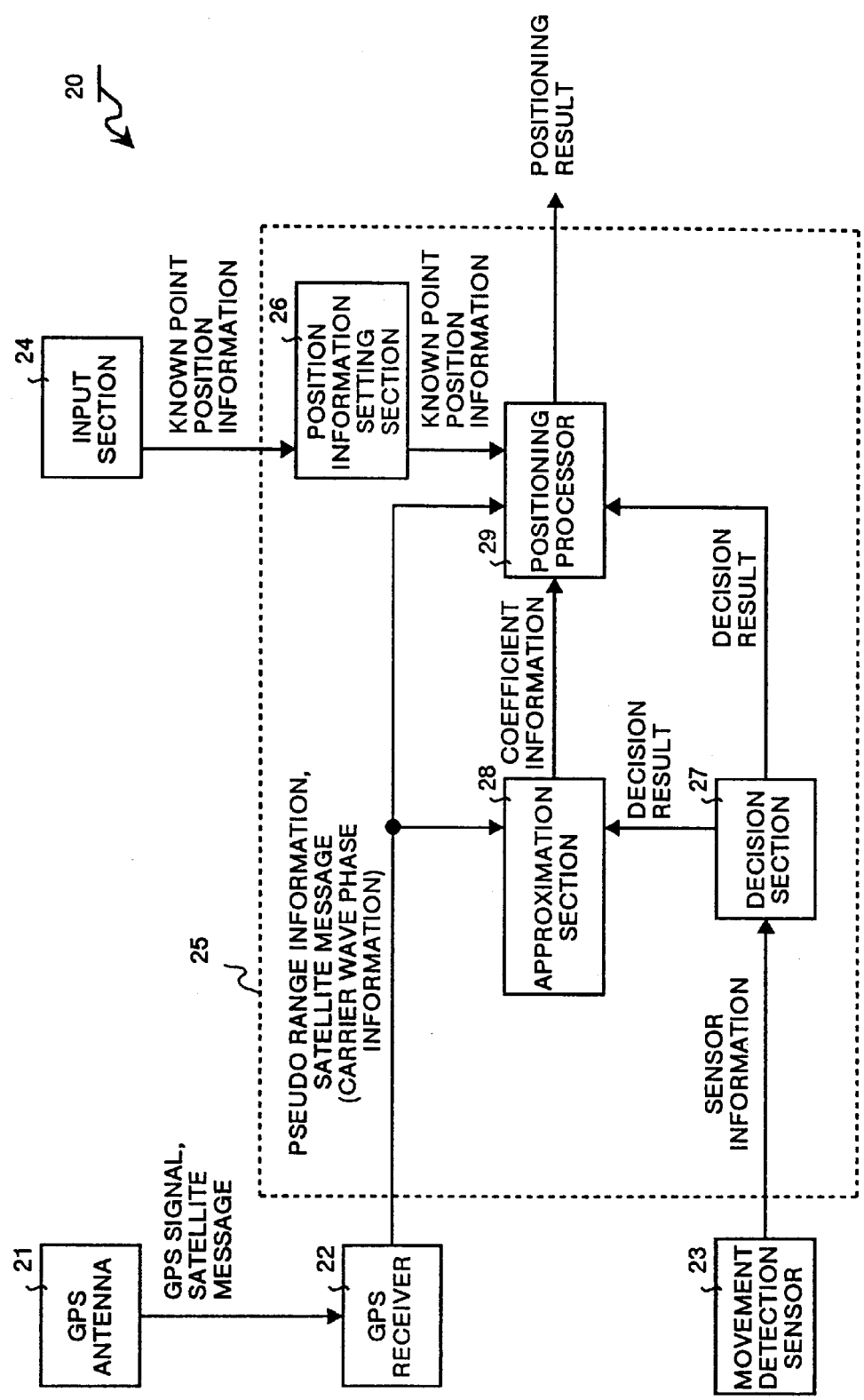
FIG. 2 is a block diagram showing the configuration of the GPS positioning apparatus 20 show in FIG. 1.

The configuration of the GPS positioning apparatus 20 will be described below with reference to FIG. 2. A GPS receiver 22 receives radio waves from the GPS satellites 1A, 1B, 1C and 1D as GPS signals and satellite messages through a GPS antenna 21. In this case, although the GPS signals are C/A code, P code, and satellite message got on carrier waves of L1 band and L2 band, the C/A code opening to the public is used in the differential method. The satellite message is orbit information of a GPS satellite, coarse orbit information of all satellites, a satellite layer correction coefficient, a correction coefficient of a satellite clock (atomic clock) or the like.

In the differential method, the GPS receiver 22 calculates pseudo distances (observation amounts) between the GPS antenna 21 (known point A) and the GPS satellites 1A, 1B, 1C and 1D from the GPS signals (C/A codes) at predetermined intervals to output pieces of pseudo distance information and satellite messages.

A movement detection sensor 23 is a sensor for detecting the movement of the moving object 10 (see FIG. 1), is, for example, a speed sensor, an acceleration sensor or the like. The movement detection sensor 23 outputs a detection result as sensor information. An input section 24 is to input three-dimensional coordinates (to be referred to as known point position information hereinafter) at the known point A (see FIG. 1), and is, for example, an input interface such as a ten key pad, a keyboard, or a touch panel. The known point position information is information obtained from another information source such as a map.

A positioning apparatus 25 calculates the three-dimensional coordinates (positions) of an unknown point AB and the unknown point B (see FIG. 1) on the basis of the sensor information, the known point position information, the pseudo distance information, and the satellite messages. The positioning apparatus 25 is constituted by a position information setting section 26, a decision section 27, an approximation section 28 and a positioning processor 29. The position information setting section 26 sets the known point position information input by the input section 24 in the positioning processor 29. The decision section 27 decides on the basis of the sensor information input from the movement detection sensor 23 whether the state of the moving object 10 (see FIG. 1) is a moving state or a static state. The decision section 27 outputs a decision result (moving state or static state) to the approximation section 28 and the positioning processor 29.

The approximation section 28 calculates the approximation expressions of a plurality of pseudo distances (GPS observation amounts) obtained from the pieces of pseudo distance information sequentially input from the GPS receiver 22 by using a method such as a least squares approximate polynomial while the moving object 10 is in a static state. As an example, when the least squares approximate polynomial is used, the approximation section 28 calculates jth-order least squares approximate polynomials using time (time differences) as variables with respect to the GPS satellites 1A, 1B, 1C and 1D, and outputs 0-order to jth-order coefficients in the least squares approximate polynomials as coefficient information to the positioning processor 29. The details of the operation of the approximation section 28 will be described later.

When the positioning processor 29 calculates pseudo distances as pseudo distance prediction values on the basis of the least squares approximate polynomials obtained from the coefficient information when the decision result input by the decision section 27 is a moving state. The positioning processor 29 performs positioning calculation by the differential method using the pseudo distance prediction values, the known point position information, and pseudo distances (actual GPS observation amounts) at the unknown point AB (or unknown point B). The details of the operation of the positioning processor 29 will be described later.

Figure 3:
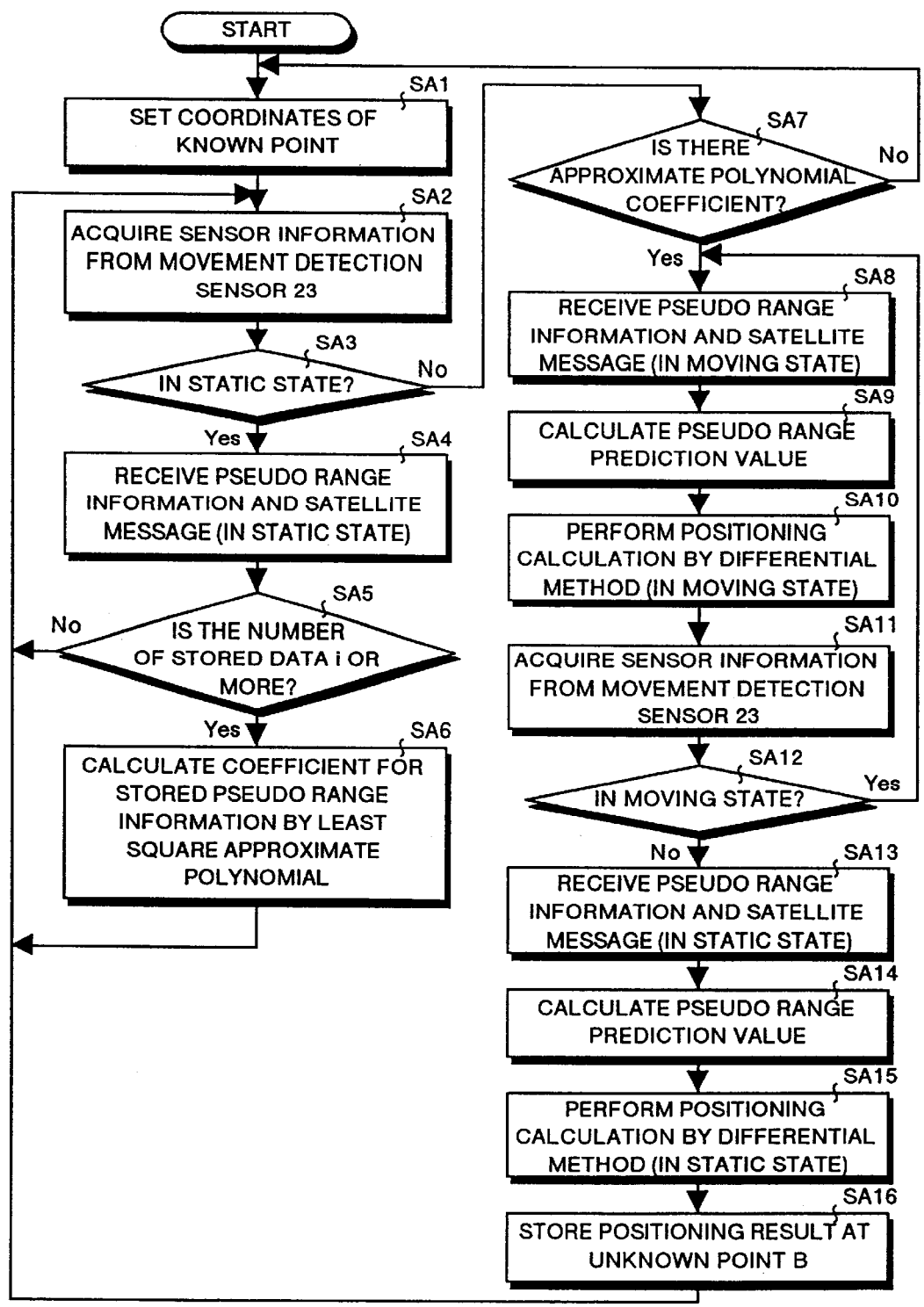
FIG. 3 is a flowchart showing a positioning operation when a differential method is used in the GPS positioning apparatus 20 shown in FIG. 1.

A positioning operation using the differential method in the GPS positioning apparatus 20 will be described here with reference to the flowchart shown in FIG. 3. In FIG. 1, a user of the GPS positioning apparatus 20 stops the moving object 10 at the known point A. In this state, at step SA1 shown in FIG. 3, the coordinates (known point position information) of the known point (in this case, the known point A) is set. More specifically, known point position information at the known point A is input by the input section 24 shown in FIG. 2, and the known point position information is set in the positioning processor 29 by the position information setting section 26.

After the decision section 27 acquires sensor information from the movement detection sensor 23 at step SA2, the decision section 27 shifts to step SA3. At step SA3, the decision section 27 decides on the basis of the acquired sensor information whether the moving object 10 is in a static state. In this case, since the moving object 10 is in a static state, the sensor information is information representing the static state. The decision section 27 sets "YES" as a decision result to shift to step SA4. When the moving object 10 is set in a moving state, the decision result at step SA3 is "NO".

At step SA4, the approximation section 28 (positioning processor 29) receives pieces of pseudo distance information and satellite messages, the numbers of which are equal to or lower than the number of channels of the GPS receiver 22 and the number (in this case, four) of visible satellites, from the GPS receiver 22. In the example shown in FIG. 1, the approximation section 28 (positioning processor 29) receives pseudo distances $O_{A1}$ ($t_1$), $O_{A2}$ ($t_1$), $O_{A3}$ ($t_1$) and $O_{A4}$ ($t_1$) between the GPS antenna 21 (known point A) and the GPS satellites 1A, 1B, 1C and 1D and satellite messages at time $t_1$, and stores these pseudo distances and the satellite messages. Thereafter, the approximation section 28 shifts to step SA5. At step SA5, when the number of data stored at step SA4 is one, the approximation section 28 decides whether i or more data which are set in advance are stored or not. In this case, when the number of stored data is smaller than i, the approximation section 28 (positioning processor 29) sets "NO" as a decision result at step SA5.

In this manner, the processes at step SA2 to step SA5 described above are repeated until the decision result at step SA3 becomes "NO" or the decision result at step SA5 becomes "YES". More specifically, at step SA2 to step SA5, pseudo distances $O_{A1}$, $O_{A2}$, $O_{A3}$, and $O_{A4}$ at times $t_2$, $t_3$ ... , $t_m$ at the known point A are stored, respectively. The stored data at time $t_1$ to time $t_m$ will be separately described below for the GPS satellites 1A, 1B, 1C and 1D.

GPS satellite 1A: $O_{A1}(t_1)$, $O_{A1}(t_2)$, $O_{A1}(t_3)$, . . . , $O_{A1}(t_m)$
GPS satellite 1B: $O_{A2}(t_1)$, $O_{A2}(t_2)$, $O_{A2}(t_3)$, . . . , $O_{A2}(t_m)$
GPS satellite 1C: $O^{A3}(t_1)$, $O_{A3}(t_2)$, $O_{A3}(t_3)$, . . . , $O_{A3}(t_m)$
GPS satellite 1D: $O_{A4}(t_1)$, $O_{A4}(t_2)$, $O_{A4}(t_3)$, . . . , $O_{A4}(t_m)$ At time $t_m$, when i data are stored, the approximation section 28 sets "YES" as a decision result at step SA5 to shift to step SA6. At step SA6, the approximation section 28 calculates jth-order least squares approximate polynomials using a time (time difference $\Delta t$) as a variable for the GPS satellites 1A, 1B, 1C and 1D on the basis of i time series pseudo distances stored in a period of time from past time $t_1$ to time $t_m$, and calculates 0-order to jth-order coefficients. The coefficients will be separately described below for the GPS satellites 1A, 1B, 1C and 1D.

GPS satellite 1A: $C_{01}$ (0-order coefficient), $C_{11}$ (1st-order coefficient), . . . , $C_{j1}$ (j-order coefficient)
GPS satellite 1B: $C_{02}$ (0-order coefficient), $C_{12}$ (1st-order coefficient), . . . , $C_{j2}$ (j-order coefficient)
GPS satellite 1C: $C_{03}$ (0-order coefficient), $C_{13}$ (1st-order coefficient), . . . , $C_{j3}$ (j-order coefficient)
GPS satellite 1D: $C_{04}$ (0-order coefficient), $C_{14}$ (1st-order coefficient), . . . , $C_{j4}$ (j-order coefficient)

The approximation section 28 outputs the coefficients calculated as described above to the positioning processor 29 as coefficient information, and the decision section 27 executes the process at step SA2. More specifically, at step SA2, the decision section 27 acquires sensor information from the movement detection sensor 23 and then shifts to step SA3. It is assumed that the moving object 10 begins to move from the known point A to the unknown point B in a period of time between time $t_m$ and time $t_{m+1}$, In this case, the decision section 27 sets "NO" as a decision result at step SA3, and outputs the decision result (moving state) to the approximation section 28 (positioning processor 29).

In this manner, at step SA7, the positioning processor 29 decides whether there is a coefficient in the least squares approximate polynomial, in other words, whether or not coefficient information is normally input. When the decision result is "NO", the processes are executed again from the process at step SA1. In this case, assuming that the decision result at step SA7 is "YES", the positioning processor 29 shifts to step SA8.

At step SA8, the positioning processor 29 receives pseudo distance information and satellite messages from the GPS receiver 22 while the moving object 10 is moving. In the example shown in FIG. 1, the positioning processor 29 receives pseudo distances $O_{AB1}(t_{m+1})$, $O_{AB2}(t_{m+1})$, $O_{AB3}(t_{m+1})$ and $O_{AB4}(t_{m+1})$, between the GPS antenna 21 (unknown point AB) and the GPS satellites 1A, 1B, 1C and 1D and satellite messages at time $t_{m+1}$, and stores these pseudo distances and the satellite messages to shift to step SA9.

At step SA9, the positioning processor 29 calculates pseudo distance values $O_{A1}'$, $O_{A2}'$, $O_{A3}'$, and $O_{A4}'$ at the known point A by substituting time differences $\Delta t$ (in this case, $\Delta t = t_{m+1} - t_m$, where $t_m$ is time immediately before movement) for avariable of a least squares approximate polynomial obtained from the coefficients input by the approximation section 28 as coefficient information at step SA6, and then shifts to step SA10. These pseudo distance values $O_{A1}'$, $O_{A2}'$, $O_{A3}'$, and $O_{A4}'$ are prediction values of the pseudo distances $O_{A1}$, $O_{A2}$, $O_{A3}$, and $O_{A4}$ which may be observed at the known point A at time $t_{m+1}$ at which the GPS receiver 22 receives the GPS signals and the satellite messages at the unknown point AB. Calculations for the pseudo distance values $O_{A1}'$, $O_{A2}'$, $O_{A3}'$, and $O_{A4}'$ will be described below.

GPS satellite 1A: $O_{A1}'(t_{m+1}) = C_{01} + C_{11} \cdot \Delta t + C_{21} \cdot \Delta t^2 + \ldots + C_{j1} \cdot \Delta t^j$ GPS satellite 1B: $O_{A2}'(t_{m+1}) = C_{02} + C_{12} \cdot \Delta t + C_{22} \cdot \Delta t^2 + \ldots + C_{j2} \cdot \Delta t^j$ GPS satellite 1C: $O_{A3}'(t_{m+1}) = C_{03} + C_{13} \cdot \Delta t + C_{23} \cdot \Delta t^2 + \ldots + C_{j3} \cdot \Delta t^j$ GPS satellite 1D: $O_{A4}'(t_{m+1}) = C_{04} + C_{14} \cdot \Delta t + C_{24} \cdot \Delta t^2 + \ldots + C_{j4} \cdot \Delta t^j$ At step SA10, the positioning processor 29 executes a positioning calculation by the differential method described above. The positioning processor 29 calculates the three-dimensional coordinates (positions) of the GPS satellites 1A, 1B, 1C and 1D at time $t_{m+1}$ from the satellite messages. The positioning processor 29 then applies the three-dimensional coordinates of the known point A obtained from known point position information and the three-dimensional coordinates of the GPS satellites 1A, 1B, 1C and 1D obtained from the satellite messages to the Pythagoras theorem to calculate geometrical distances (theoretical values).

Figure 8:
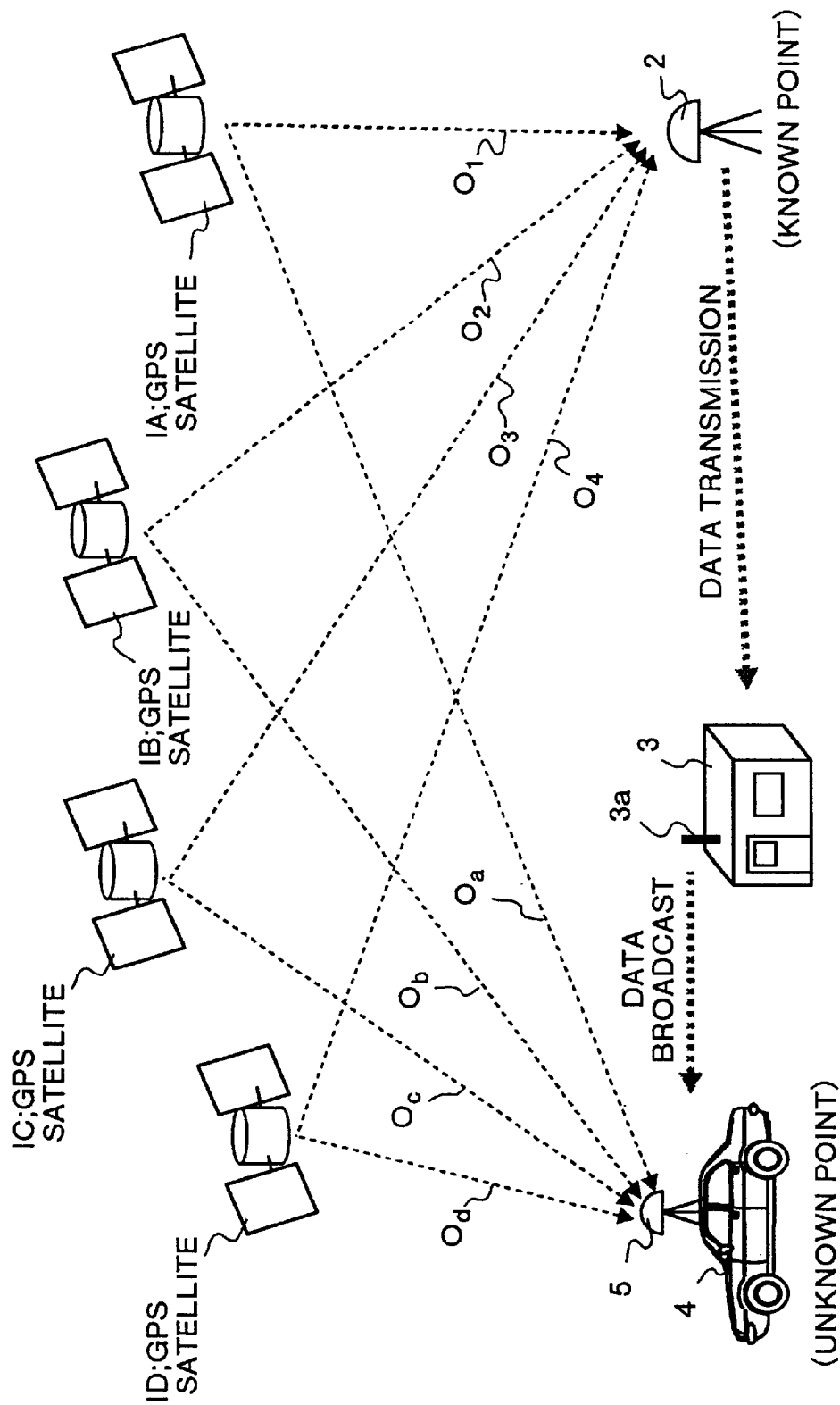
FIG. 8 is a diagram for explaining a positioning method when a differential method is used in a conventional GPS positioning apparatus.
Figure 9:
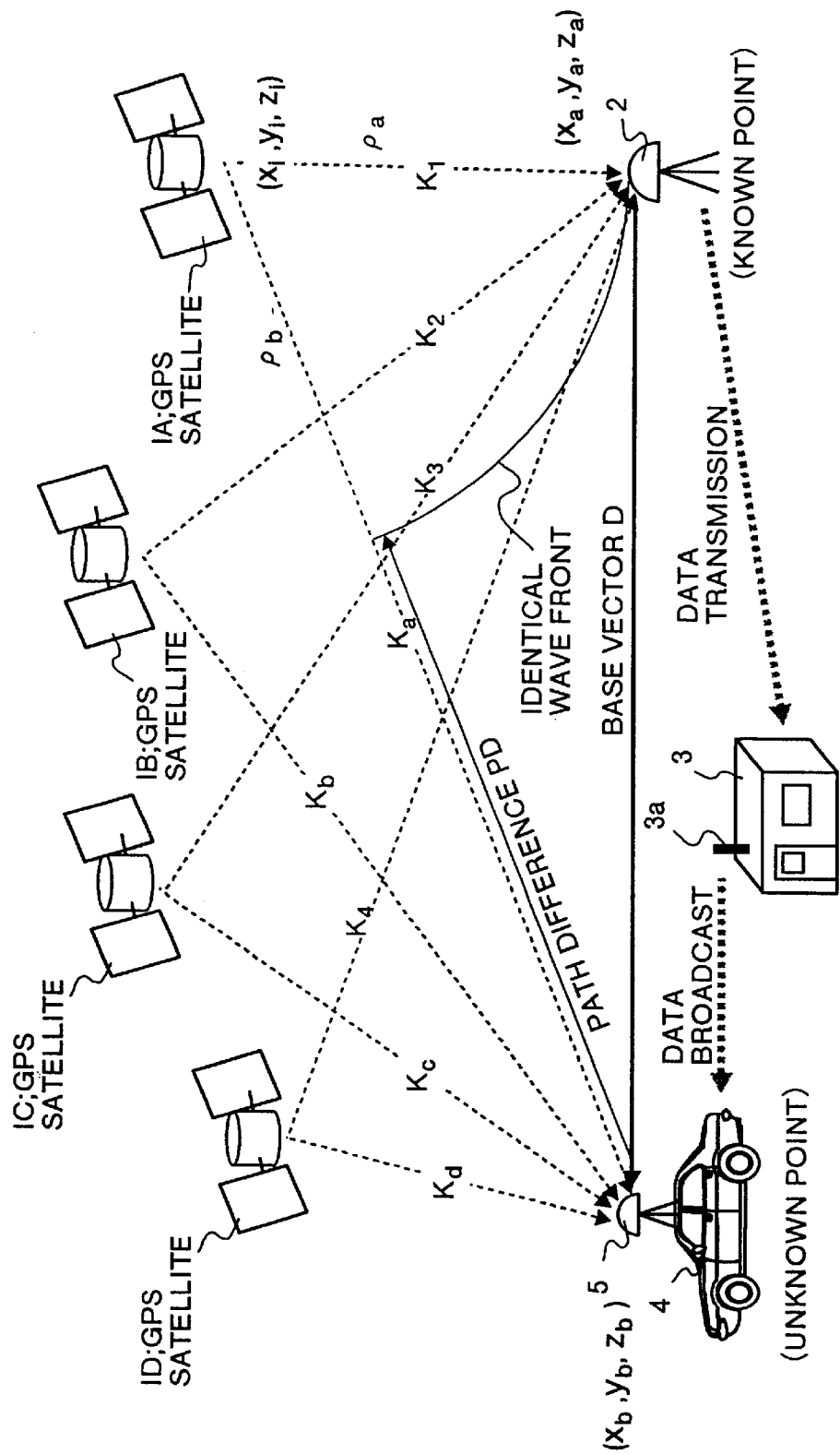
FIG. 9 is a diagram for explaining a positioning method when an interference positioning method is used in a conventional GPS positioning apparatus.

In addition, the positioning processor 29 calculates the differences between the theoretical values and the pseudo distance prediction values $O_{A1}'(t_{m+1})$, $O_{A2}'(t_{m+1})$, $O_{A3}'(t_{m+1})$ and $O_{A4}'(t_{m+1})$ as prediction correction values. The prediction correction values are considered to be equivalent to correction values calculated by the known point side GPS positioning apparatus 2 (see FIG. 8) in the conventional differential method, and correspond to propagation delay errors or the like caused by the ionized layer.

Next, the positioning processor 29 subtracts the prediction correction values from the pseudo distances $O_{AB1}$, $O_{AB2}$, $O_{AB3}$ and $O_{AB4}$ received at step SA8, respectively. By the subtraction, common error components (an error of orbit information of a GPS satellite, part of an error caused by fluctuation given to a code by the SA, a propagation delay error caused by the ionized layer, and a propagation delay error caused by the troposphere) are canceled.

The positioning processor 29, as in the single positioning method described above, solves quaternary simultaneous equations (positioning equations) on the basis of the pieces of position information of the GPS satellites 1A, 1B, 1C and 1D and the subtraction results (distances from which error components are removed) to calculate the position (three-dimensional coordinates) of the unknown point AB, and outputs the position to a display section (not shown) as a positioning result. Since the accuracy of the positioning result is calculated on the basis of the prediction correction values at the known point A, the accuracy is considered to be equivalent to the accuracy of the positioning result obtained by the conventional differential method.

At step SA11, the decision section 27 acquires sensor information from the movement detection sensor 23 and then shifts to step SA12. In this case, since the moving object 10 is in a moving state, the sensor information is information representing the moving state. At step SA12, the decision section 27 decides on the basis of the acquired sensor information whether or not the moving object 10 is moving. In this case, the decision section 27 sets "YES" as a decision result. In this manner, the positioning processor 29 repeats the processes at step SA8 to step SA11 until the decision result at step SA12 becomes "NO", i.e., the moving object 10 is set in a static state.

In this case, the pseudo distances (GPS observation amounts) $O_{AB1}$ to $O_{AB4}$ at the unknown point AB in a period of time between time $t_{m+2}$ and time tn are as follows:

GPS satellite 1A: $O_{AB1}(t_{m+2})$, $O_{AB1}(t_{m+3})$, ..., $O_{AB1}(t_n)$

GPS satellite 1B: $O_{AB2}(t_{m+2})$, $O_{AB2}(t_{m+3})$, ..., $O_{AB2}(t_n)$

GPS satellite 1C: $O_{AB3}(t_{m+2})$, $O_{AB3}(t_{m+3})$, ..., $O_{AB3}(t_n)$

GPS satellite 1D: $O_{AB4}(t_{m+2})$, $O_{AB4}(t_{m+3})$, ..., $O_{AB4}(t_n)$

The decision section 27, as in the operation described above, calculates the positions at the unknown points AB at predetermined intervals between time $t_{m+2}$ to time $t_n$ on the basis of pseudo distance prediction values and correction prediction values. At time $t_{n+1}$, when the moving object 10 reaches the unknown point B and then is stopped, the decision result at step SA12 becomes "NO". At step SA13, the positioning processor 29, as at step SA8, receives pseudo distances $O_{B1}$, $O_{B2}$, $O_{B3}$ and $O_{B4}$ at time $t_{n+1}$ at the unknown point B and satellite messages and then shifts to step SA14. At step SA14, the positioning processor 29, as at step SA9, calculates pseudo distance prediction values $O_{A1}'(t_{n+1})$, $O_{A2}'(t_{n+1})$, $O_{A3}'(t_{n+1})$ and $O_{A4}'(t_{n+1})$ and then shifts to step SA15.

At step SA15, the positioning processor 29, as at step SA10, calculates prediction correction amounts corresponding to the pseudo distance prediction values $O_{A1}'(t_{n+1})$, $O_{A2}'(t_{n+1})$, $O_{A3}'(t_{n+1})$ and $O_{A4}'(t_{n+1})$ on the basis of the pseudo distance prediction values $O_{A1}'(t_{n+1})$, $O_{A2}'(t_{n+1})$, $O_{A3}'(t_{n+1})$, and $O_{A4}'(t_{n+1})$. Next, the positioning processor 29 subtracts the prediction correction amounts from the pseudo distances $O_{B1}$, $O_{B2}$, $O_{B3}$ and $O_{B4}$ received at step SA13, respectively. By the subtraction, common error components of the error components at the known point A and the unknown point B are canceled.

The positioning processor 29, as in the single positioning method described above, solves quaternary simultaneous equations (positioning equations) on the basis of the pieces of position information of the GPS satellites 1A, 1B, 1C and 1D and the subtraction results described above (distances from which error components are removed) to calculate the position (three-dimensional coordinates) of the unknown point B, outputs the position to a display section (not shown) as a positioning result, and then shifts to step SA16. At step SA16, the positioning processor 29 stores the positioning result at the unknown point B and then returns to step SA2. In this manner, the positioning result at the unknown point B is used as new known point position information, so that the processes at step SA2 to step SA16 are repeated.

A positioning operation performed when the interference positioning method is used in the GPS positioning apparatus 20 will be described below with reference to the flowcharts shown in FIG. 4 and FIG. 5. The following description is almost the same as that in the differential method described with reference to FIG. 1 to FIG. 3 except that carrier wave phases are used in place of pseudo distances and that the interference positioning method is used in place of the differential method described above.

Figure 4:
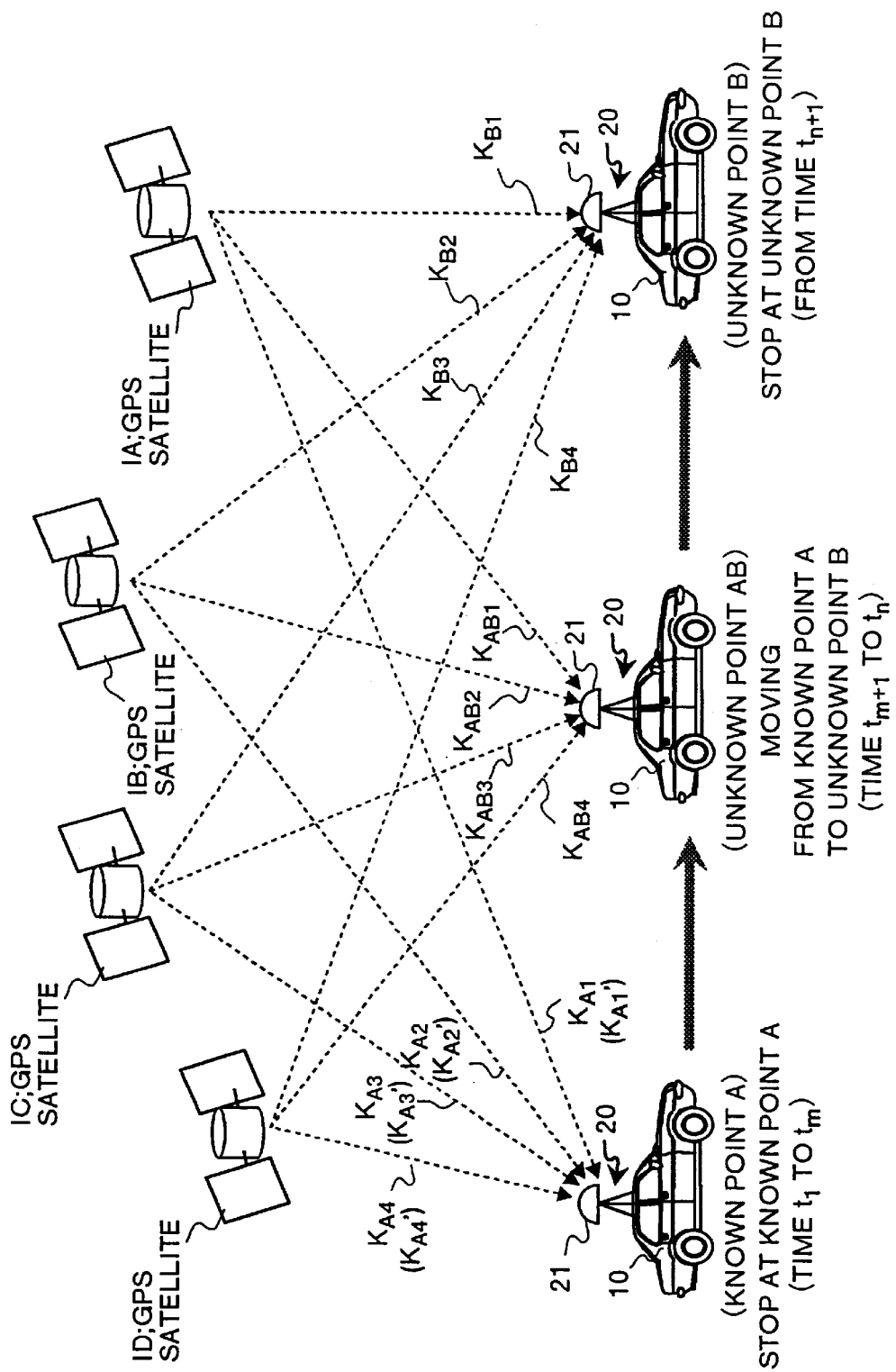
FIG. 4 is a diagram showing a rough configuration of a GPS positioning system when an interference positioning method is used in the GPS positioning apparatus 20 according to an embodiment of the present invention.
Figure 5:
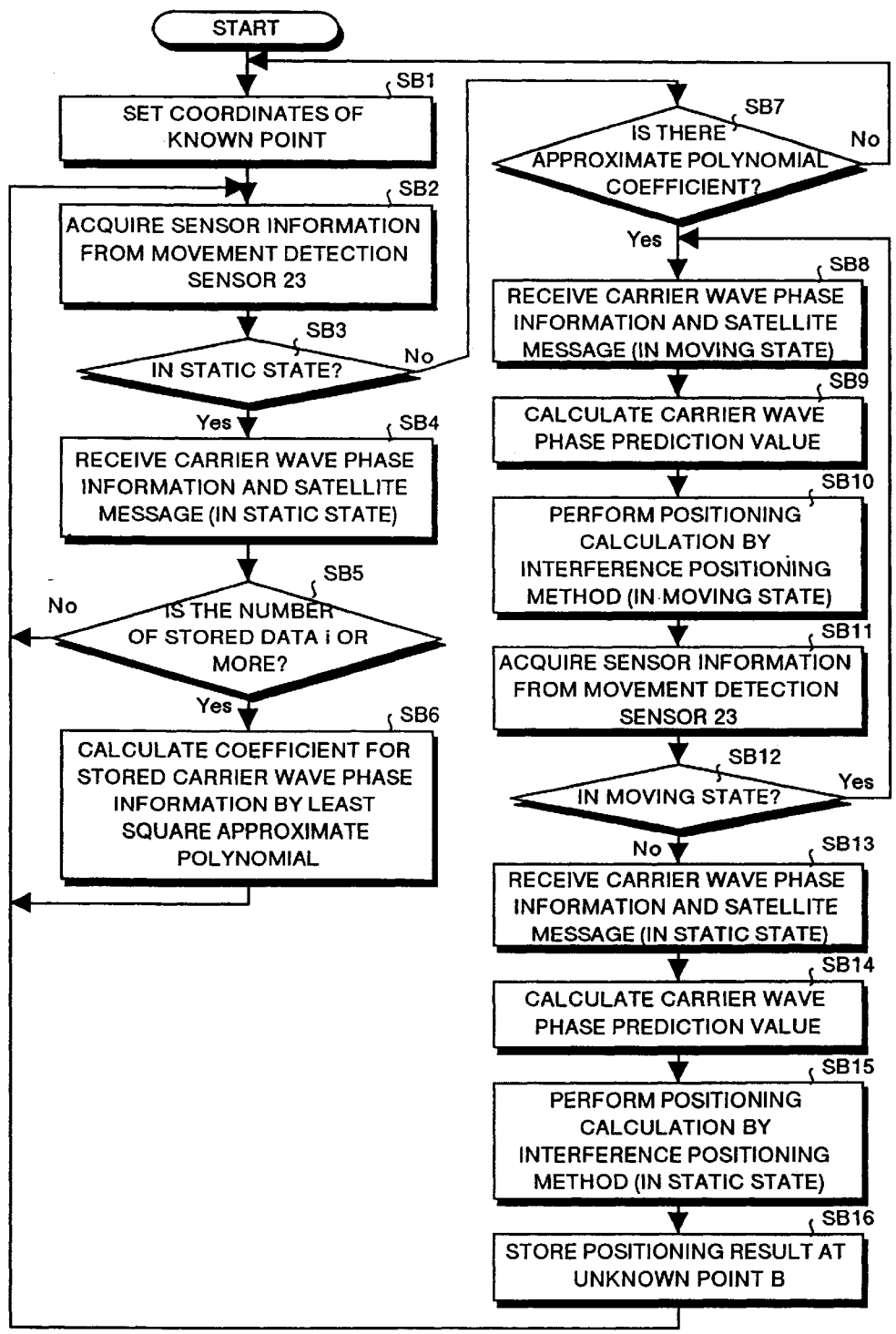
FIG. 5 is a flowchart showing a positioning operation when an interference positioning method is used in the GPS positioning apparatus 20 shown in FIG. 1.

In FIG. 4, a user of the GPS positioning apparatus 20 stops the moving object 10 at the known point A. In this state, at step SB1 shown in FIG. 5, the coordinates (known point position information) of a known point (in this case, the known point A) is set. At step SB2, the decision section 27 acquires sensor information from the movement detection sensor 23, and then shifts to step SB3 to decide, on the basis of the acquired sensor information, whether or not the moving object 10 is in a static state. In this case, the decision section 27 sets "YES" as a decision result.

At step SB4, the approximation section 28 (positioning processor 29) receives carrier wave phase information and satellite messages from the GPS receiver 22. The approximation section 28 (positioning processor 29), in the example shown in FIG. 4, receives carrier wave phases $K_{A1}(t_1)$, $K_{A2}(t_1)$, $K_{A3}(t_1)$ and $K_{A4}(t_1)$ corresponding to the GPS satellites 1A, 1B, 1C and 1D and satellite messages at time $t_1$, and stores these carrier wave phases and the satellite messages. Thereafter, the approximation section 28 shifts to step SB5. At step SB5, when the number of data stored at step SB4 is one, the approximation section 28 decides whether or not i or more data which are set in advance are stored or not. In this case, when the number of stored data is smaller than i, the approximation section 28 (positioning processor 29) sets "NO" as a decision result at step SB5.

In this manner, the processes at step SB2 to step SB5 described above are repeated until the decision result at step SB3 becomes "NO" or the decision result at step SB5 becomes "YES". More specifically, at step SB2 to step SB5, carrier wave phases $K_{A1}$, $K_{A2}$, $K_{A3}$ and $K_{A4}$ at times $t_2$, $t_3$, ..., $t_m$ at the known point A are stored, respectively. The stored data at time $t_1$ to time $t_m$ will be separately described below for the GPS satellites 1A, 1B, 1C and 1D.

GPS satellite 1A: $K_{A1}(t_1)$, $K_{A1}(t_2)$, $K_{A1}(t_3)$, ..., $K_{A1}(t_m)$
GPS satellite 1B: $K_{A2}(t_1)$, $K_{A2}(t_2)$, $K_{A2}(t_3)$, ..., $K_{A2}(t_m)$
GPS satellite 1C: $K_{A3}(t_1)$, $K_{A3}(t_2)$, $K_{A3}(t_3)$, ..., $K_{A3}(t_m)$
GPS satellite 1D: $K_{A4}(t_1)$, $K_{A4}(t_2)$, $K_{A4}(t_3)$, ..., $K_{A4}(t_m)$ At time $t_m$, when i data are stored, the approximation section 28 sets "YES" as a decision result at step SB5 to shift to step SB6. At step SB6, the approximation section 28 calculates jth-order least squares approximate polynomials using a time (time difference $\Delta t$) as a variable for the GPS satellites 1A, 1B, 1C and 1D on the basis of i time series carrier wave phases stored in a period of time from past time $t_1$ to time $t_m$, and calculates 0-order to jth-order coefficients. The coefficients will be separately described below for the GPS satellites 1A, 1B, 1C and 1D.

GPS satellite 1A: $C_{01}$ (0-order coefficient), $C_{11}$ (1st-order coefficient), ..., $C_{j1}$ (j-order coefficient)
GPS satellite 1B: $C_{02}$ (0-order coefficient), $C_{12}$ (1st-order coefficient), ..., $C_{j2}$ (j-order coefficient)
GPS satellite 1C: $C_{03}$ (0-order coefficient), $C_{13}$ (1st-order coefficient), ..., $C_{j3}$ (j-order coefficient)
GPS satellite 1D: $C_{04}$ (0-order coefficient), $C_{14}$ (1st-order coefficient), ..., $C_{j4}$ (j-order coefficient)

The approximation section 28 outputs the coefficients calculated as described above to the positioning processor 29 as coefficient information, and the decision section 27 executes the process at step SB2. That is, at step SB2, the decision section 27 acquires sensor information from the moving object 10 and then shifts to step SB3. It is assumed that the moving object 10 begins to move from the known point A to the unknown point B in a period of time between time $t_m$ and time $t_{m+1}$. In this case, the decision section 27 sets "NO" as a decision result at step SB3, and outputs the decision result (moving state) to the approximation section 28 (positioning processor 29).

In this manner, at step SB7, the positioning processor 29 decides whether or not there is a coefficient in the least squares approximate polynomial, in other words, whether or not coefficient information is normally input. Assuming that the decision result is "NO", the positioning processor 29 shifts to step SB8. At step SB8, the positioning processor 29 receives carrier wave phase information and satellite messages from the GPS receiver 22 while the moving object 10 is moving. In the example shown in FIG. 4, the positioning processor 29 receives carrier wave phases $K_{AB1}(t_{m+1})$, $K_{AB2}(t_{m+1})$, $K_{AB3}(t_{m+1})$ and $K_{AB4}(t_{m+1})$ corresponding to the GPS satellites 1A, 1B, 1C and 1D and satellite messages at time $t_{m+1}$, and stores these carrier wave phases and the satellite messages to shift to step SB9.

At step SB9, the positioning processor 29 calculates carrier wave phase values $K_{A1}'$, $K_{A2}'$, $K_{A3}'$, and $K_{A4}'$ at the known point A by substituting time differences $\Delta t$ (in this case, $\Delta t = t_{m+1} - t_m$, where $t_m$ is time immediately before movement) for a variable of a least squares approximate polynomial obtained from the coefficients input by the approximation section 28 as coefficient information at step SB6, and then shifts to step SB10. These carrier wave phase values $K_{A1}'$, $K_{A2}'$, $K_{A3}'$, and $K_{A4}'$ are prediction values of the carrier wave phases $K_{A1}$, $K_{A2}$, $K_{A3}$ and $K_{A4}$ which may be observed at the known point A at time $t_{m+1}$ at which the GPS receiver 22 receives the GPS signals and the satellite messages at the unknown point AB. Calculations for the carrier wave phase values $K_{A1}'$, $K_{A2}'$, $K_{A3}'$, and $K_{A4}'$ will be described below.

GPS satellite 1A: $K_{A1}'(t_{m+1}) = C_{01} + C_{11} \cdot \Delta t + C_{21} \cdot \Delta t^2 + \ldots + C_{j1} \cdot \Delta t^j$ GPS satellite 1B: $K_{A2}'(t_{m+1}) = C_{02} + C_{12} \cdot \Delta t + C_{22} \cdot \Delta t^2 + \ldots + C_{j2} \cdot \Delta t^j$ GPS satellite 1C: $K_{A3}'(t_{m+1}) = C_{03} + C_{13} \cdot \Delta t + C_{23} \cdot \Delta t_2 + \ldots + C_{j3} \cdot \Delta t^j$ GPS satellite 1D: $K_{A4}'(t_{m+1}) = C_{04} + C_{14} \cdot \Delta t + C_{24} \cdot \Delta t^2 + \ldots + C_{j4} \cdot \Delta t^j$ At step SB10, the positioning processor 29 executes a positioning calculation by the interference positioning method described above. That is, the positioning processor 29 linearly combines the carrier wave phases $K_{AB1}$, $K_{AB2}$, $K_{AB3}$ and $K_{AB4}$ received at step SB8 and the carrier wave phase prediction values $K_{A1}'$, $K_{A2}'$, $K_{A3}'$, and $K_{A4}'$ as in equation (5) to equation (7) to calculate observation amounts on a mathematic model. In addition, the positioning processor 29 calculates a base vector of the unknown point AB with respect to the known point A by using the known method of least squares or the Kalman filter to calculate the position of the unknown point AB, and outputs the position to a display section (not shown) as a positioning result.

At step SB11, the decision section 27 acquires sensor information from the movement detection sensor 23 and then shifts to step SB12, and decides on the basis of the acquired sensor information, whether or not the moving object 10 is moving. In this case, the decision section 27 sets "YES" as a decision result. In this manner, the positioning processor 29 repeats the processes at step SB8 to step SB11 until the decision result at step SB12 becomes "NO".

In this case, the carrier wave phases (GPS observation amounts) $K_{AB1}$ to $K_{AB4}$ at the unknown point AB in a period of time between time $t_{m+2}$ and time $t_n$ are as follows:

GPS satellite 1A: $K_{AB1}(t_{m+2})$, $K_{AB1}(t_{m+3})$, ..., $K_{AB1}(t_n)$
GPS satellite 1B: $K_{AB2}(t_{m+2})$, $K_{AB2}(t_{m+3})$, ..., $K_{AB2}(t_n)$
GPS satellite 1C: $K_{AB3}(t_{m+2})$, $K_{AB3}(t_{m+3})$, ..., $K_{AB3}(t_n)$
GPS satellite 1D: $K_{AB4}(t_{m+2})$, $K_{AB4}(t_{m+3})$, ..., $K_{AB4}(t_n)$ The decision section 27, as in the operation described above, calculates the positions at the unknown points AB at predetermined intervals between time $t_{m+2}$ to time $t_n$ on the basis of carrier wave phase prediction values. At time $t_{n+1}$, when the moving object 10 reaches the unknown point B and then is stopped, the decision result at step SB12 becomes "NO". At step SB13, the positioning processor 29, as at step SB8, receives carrier wave phases $K_{B1}$, $K_{B2}$, $K_{B3}$ and $K_{B4}$ at time $t_{n+1}$ at the unknown point B and satellite messages and then shifts to step SB14. At step SB14, the positioning processor 29, as at step SB9, calculates carrier wave phase prediction values $K_{A1}'(t_{n+1})$, $K_{A2}'(t_{n+1})$, $K_{A3}'(t_{n+1})$, and $K_{A4}'(t_{n+1})$ at the known point A at time $t_{n+1}$ and then shifts to step SB15.

At step SB15, the positioning processor 29, as at step SB10, calculates the position of the unknown point B on the basis of the carrier wave phase prediction values $K_{A1}'(t_{n+1})$, $K_{A2}'(t_{n+1})$, $K_{A3}'(t_{n+1})$, and $K_{A4}'(t_{n+1})$, outputs the position to a display section (not shown) as a positioning result, and then shifts to step SB16. At step SB16, the positioning processor 29 stores the positioning result at the unknown point B. Thereafter, the positioning processor 29 shifts to step SB2. In this manner, the positioning result at the unknown point B is used as new known point position information, so that the processes at step SB2 to step SB16 are repeated.

As has been described above, according to the embodiment described above, pseudo distance prediction values corresponding to DGPS data transmitted in a conventional reference station are predicted by the positioning processor 29, and the position of the unknown point is calculated by the differential method on the basis of the pseudo distance prediction values. For this reason, a conventional reference station and a conventional relaying station are not necessary, and positioning can be performed at a high accuracy.

Similarly, according to the embodiment, carrier wave phase prediction values corresponding to interference positioning data transmitted in a conventional reference station are predicted by the positioning processor 29, and the position of the unknown point is calculated by the interference positioning method on the basis of the carrier wave phase prediction values. For this reason, a conventional reference station and a conventional relaying station are not necessary, and positioning can be performed at an accuracy higher than that of the differential method. In addition, according to the embodiment, since a unit for receiving data from the reference station is not necessary, the apparatus can be reduced in size.

Although an embodiment of the present invention has been described above, a concrete configuration is not limited to the embodiment, and the present invention includes a change in design which does not depart from the spirit and scope of the invention. For example, the embodiment described above, a GPS positioning program for realizing the functions of the GPS positioning apparatus 20 may be recorded on a computer readable recording medium 600 shown in FIG. 6, and the GPS positioning program recorded on the recording medium 600 may be loaded on a computer 500 shown in FIG. 6 and executed to realize the functions described above.

Figure 6:
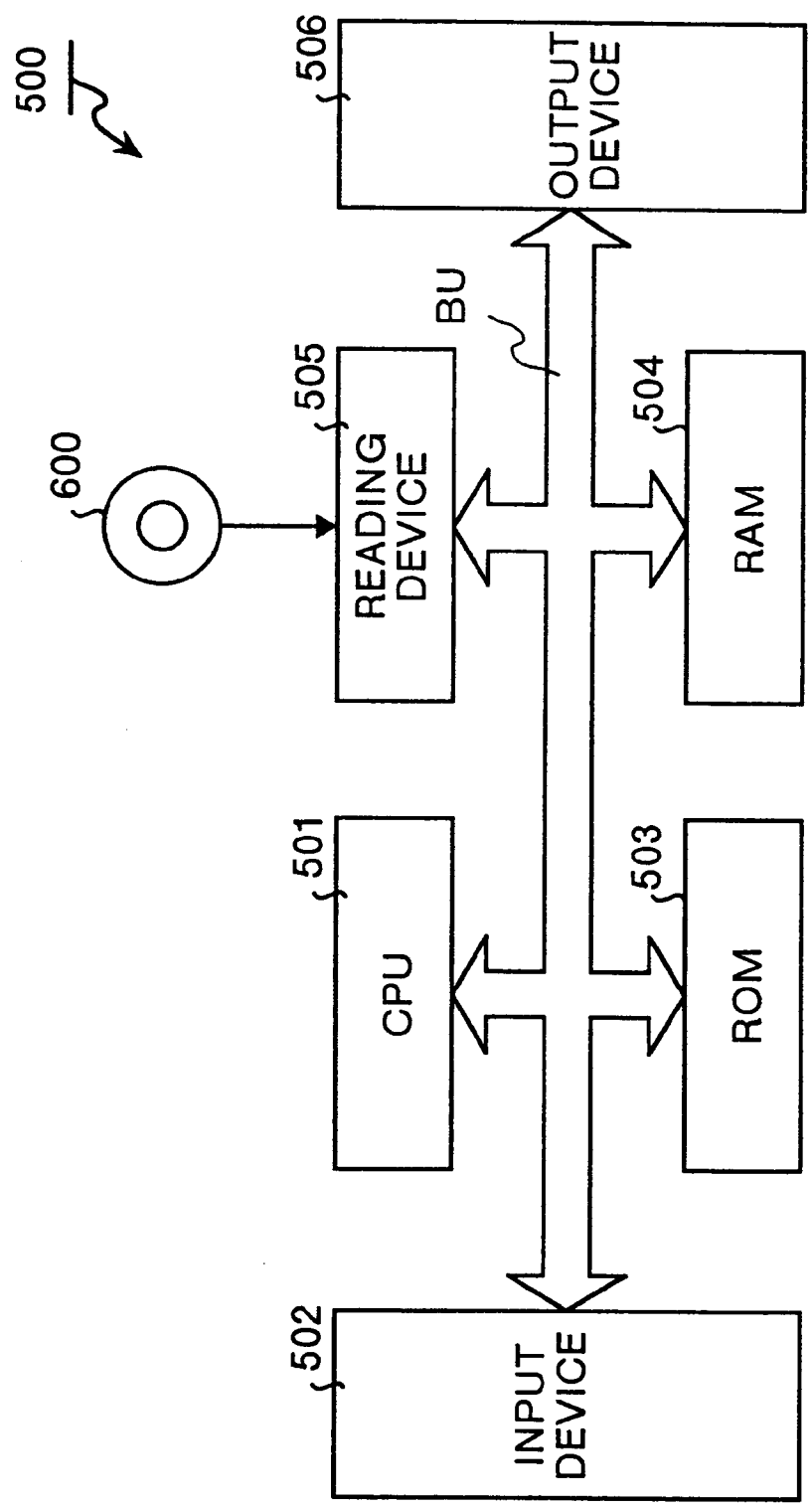
FIG. 6 is a block diagram showing a modification of an embodiment of the present invention.

The computer 500 shown in FIG. 6 is constituted by a CPU (Central Processing Section) 501 for executing the GPS positioning program, an input device 502 such as a keyboard or a mouse, a ROM (Read Only Memory) 503 for storing various data, a RAM (Random Access Memory) 504 for storing arithmetic operation parameters or the like, a reading device 505 for reading the GPS positioning program from the recording medium 600, an output device 506 such as a display or a printer, and a bus for connecting respective devices to each other.

The CPU 501 loads the GPS positioning program stored in the recording medium 600 through the reading device 505, and executes the GPS positioning program to execute the processes described above. The recording medium 600 includes such as a portable recording medium such as an optical disk, a floppy disk, or a hard disk, and also includes a transmission medium such as a network for temporarily storing data.

In the embodiment described above, in the interference positioning method, differences (single differences), the number of which is equal to the number of GPS satellites, between the pseudo distances between the GPS satellites and the known point A and the pseudo distances between the GPS satellites and the unknown point AB (or the unknown point B) may be calculated, and a base vector ($\Delta x$, $\Delta y$, $\Delta z$) from the known point A to the unknown point AB (or the unknown point B) may be calculated on the basis of the differences. In addition, in the embodiment, a difference (double difference) between the single differences may be calculated, and the base vector ($\Delta x$, $\Delta y$, $\Delta z$) may be calculated on the double difference. In addition to these methods, any method which perform positioning using data from a conventional reference station can be applied.

Furthermore, in the embodiment described above, an example in which approximation is performed by the approximation section 28 using a least squares approximate polynomial has been described. The present invention is not limited to the embodiment. Change rates (distance rates: rates of changes in distance) of observation amounts in a predetermined period of time may be calculated by calculating a difference between an observation amount previously obtained and an observation amount obtained at this time, and the rates of the distance rates (accelerations of changes in distance) may be calculated by calculating a difference between the distance rates. In this case, observation values may be predicted on the basis of the rates of the changes in distance and the acceleration of the changes in distance. In the embodiment, the GPS receiver 22 may have the functions of the positioning apparatus 25 shown in FIG. 2.

In addition, in the embodiment described above, the present invention may be used for various purposes. The present invention can be used for a purpose in which moving/static states are repeated in a limited area, e.g., a game or the like such as cart/player management in a golf course or a rally using moving objects. Finally, in the embodiment described above, an error component caused by fluctuation of a code caused by the SA cannot be completely removed from a positioning result. However, in the future, when the SA is canceled by the Department of Defense of the U.S.A. the effectiveness of prediction of observation amounts may be improved.

As has been described above, in the invention according to one aspect, observation amount prediction values corresponding to data transmitted in a conventional reference station are predicted by a prediction unit, and the position of an unknown point is calculated on the basis of the observation amount prediction values. For this reason, a conventional reference station and a conventional relaying station are not necessary, and positioning can be advantageously performed at a high accuracy. In addition, since a unit for receiving data from the reference station is not necessary, the apparatus can be advantageously reduced in size.

According to another aspect of this invention, pseudo distance prediction values corresponding to DGPS data transmitted in a conventional reference station are predicted by a prediction unit, and the position of the unknown point is calculated by the differential method on the basis of the pseudo distance prediction values. For this reason, a conventional reference station and a conventional relaying station are not necessary, and positioning can be advantageously performed at a high accuracy. In addition, since a unit for receiving data from the reference station is not necessary, the apparatus can be advantageously reduced in size.

According to still another aspect of this invention, carrier wave phase prediction values corresponding to interference positioning data transmitted in a conventional reference station are predicted by a prediction unit, and the position of the unknown point is calculated by the interference positioning method on the basis of the carrier wave phase prediction values. For this reason, a conventional reference station and a conventional relaying station are not necessary, and positioning can be performed at a higher accuracy. In addition, since a unit for receiving data from the reference station is not necessary, the apparatus can be advantageously reduced in size.

According to still another aspect of this invention, observation amount prediction values corresponding to data transmitted in a conventional reference station are predicted by the prediction step, and the position of an unknown point is calculated on the basis of the observation amount prediction values. For this reason, a conventional reference station and a conventional relaying station are not necessary, and positioning can be advantageously performed at a high accuracy. In addition, an advantage that a unit for receiving data from the reference station is not necessary can be achieved.

According to still another aspect of this invention, pseudo distance prediction values corresponding to DGPS data transmitted in a conventional reference station are predicted by the prediction step, and the position of the unknown point is calculated by the differential method on the basis of the pseudo distance prediction values. For this reason, a conventional reference station and a conventional relaying station are not necessary, and positioning can be advantageously performed at a high accuracy. In addition, an advantage that a unit for receiving data from the reference station is not necessary can be achieved.

According to still another aspect of this invention, carrier wave phase prediction values corresponding to interference positioning data transmitted in a conventional reference station are predicted by the prediction step, and the position of the unknown point is calculated by the interference positioning method on the basis of the carrier wave phase prediction values. For this reason, a conventional reference station and a conventional relaying station are not necessary, and positioning can be performed at a higher accuracy. In addition, an advantage that a unit for receiving data from the reference station is not necessary is achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A GPS positioning apparatus which determines a position of an unknown point on the basis of a plurality of observation amounts obtained by receiving radio waves from the plurality of GPS satellites, said apparatus comprising:

an input unit which inputs position information of a known point;

an approximating unit which approximates the plurality of observation amounts obtained at the known point as approximate expressions using a time as a variable, respectively;

a predicting unit which predicts, on the basis of the plurality of approximation expressions, a plurality of observation amounts at the unknown point at time at which a plurality of observation amounts are obtained at an unknown point as a plurality of observation amount prediction values; and a positioning unit which calculates the position of the unknown point on the basis of the position information of the known point and the plurality of observation amount prediction values from results obtained by correcting error components of the plurality of observation amounts at the unknown point.

2. A GPS positioning apparatus which determines a position of an unknown point on the basis of pseudo distances to a plurality of GPS satellites obtained by receiving radio waves from the plurality of GPS satellites, said apparatus comprising:

an input unit which inputs position information of a known point;

an approximating unit which approximates the plurality of pseudo distances obtained at the known point as approximate expressions using a time as a variable, respectively;

a predicting unit which predicts, on the basis of the approximation expressions, the plurality of pseudo distances at the known point at time at which the plurality of pseudo distances are obtained at the unknown point as a plurality of pseudo distance prediction values; and a positioning unit which calculates the position of the unknown point by a differential method using the position information of the known point, the plurality of pseudo distance prediction values, and the plurality of pseudo distances at the unknown point.

3. A GPS positioning apparatus which determines a position of an unknown point on the basis of carrier wave phases obtained by receiving radio waves from a plurality of GPS satellites, said apparatus comprising:

an input unit which inputs position information of a known point;

an approximating unit which approximates the plurality of carrier wave phases obtained at the known point as approximate expressions using a time as a variable, respectively;

a predicting unit which predicts, on the basis of the approximation expressions, the plurality of carrier wave phases at the known point at time at which the plurality of carrier wave phases are obtained at the unknown point as a plurality of carrier wave phase prediction values; and a positioning unit which calculates the position of the unknown point by an interference positioning method using the position information of the known point, the plurality of carrier wave phase prediction values, and the plurality of carrier wave phases at the unknown point.

4. A GPS positioning method of determining a position of an unknown point on the basis of a plurality of observation amounts obtained by receiving radio waves from the plurality of GPS satellites, said method comprising:

an input step of inputting position information of a known point;

an approximating step of approximating the plurality of observation amounts obtained at the known point as approximate expressions using a time as a variable, respectively;

a predicting step of predicting, on the basis of the plurality of approximation expressions, a plurality of observation amounts at the known point at time at which a plurality of observation amounts are obtained at an unknown point as a plurality of observation amount prediction value; and a positioning step of calculating the position of the unknown point on the basis of the position information of the known point and the plurality of observation amount prediction values from results obtained by correcting error components of the plurality of observation amounts at the unknown point.

5. A GPS positioning method of determining a position of an unknown point on the basis of pseudo distances to a plurality of GPS satellites obtained by receiving radio waves from the plurality of GPS satellites, said method comprising:

an input step of inputting position information of a known point;

an approximating unit of approximating the plurality of pseudo distances obtained at the known point as approximate expressions using a time as a variable, respectively;

a predicting step of predicting, on the basis of the approximation expressions, the plurality of pseudo distances at the known point at time at which the plurality of pseudo distances are obtained at the unknown point as a plurality of pseudo distance prediction values; and a positioning step of calculating the position of the unknown point by a differential method using the position information of the known point, the plurality of pseudo distance prediction values, and the plurality of pseudo distances at the unknown point.

6. A GPS positioning method of determining a position of an unknown point on the basis of carrier wave phases obtained by receiving radio waves from a plurality of GPS satellites, said method comprising:

an input step of inputting position information of a known point;

an approximating step of approximating the plurality of carrier wave phases obtained at the known point as approximate expressions using a time as a variable, respectively;

a predicting step of predicting, on the basis of the approximation expressions, the plurality of carrier wave phases at the known point at time at which the plurality of carrier wave phases are obtained at the unknown point as a plurality of carrier wave phase prediction values; and a positioning step of calculating the position of the unknown point by an interference positioning method using the position information of the known point, the plurality of carrier wave phase prediction values, and the plurality of carrier wave phases at the unknown point.

7. A computer readable recording medium on which a GPS positioning program applied to GPS positioning of determining a position of an unknown point on the basis of a plurality of observation amounts obtained by receiving radio waves from a plurality of GPS satellites is recorded, wherein said recording medium records the GPS positioning program for causing a computer to execute the steps of:

inputting position information of a known point;

approximating the plurality of observation amounts obtained at the known point as approximate expressions using a time as a variable, respectively;

predicting, on the basis of the plurality of approximation expressions, a plurality of observation amounts at the known point at time at which a plurality of observation amounts are obtained at an unknown point as a plurality of observation amount prediction value; and calculating the position of the unknown point on the basis of the position information of the known point and the plurality of observation amount prediction values from results obtained by correcting error components of the plurality of observation amounts at the unknown point.

8. A computer readable recording medium on which a GPS positioning program applied to GPS positioning of determining a position of an unknown point on the basis of pseudo distances to a plurality of GPS satellites obtained by receiving radio waves from the plurality of GPS satellites is recorded, wherein said recording medium records the GPS positioning program for causing a computer to execute the steps of:

inputting position information of a known point;

approximating the plurality of pseudo distances obtained at the known point as approximate expressions using a time as a variable, respectively;

predicting, on the basis of the approximation expressions, the plurality of pseudo distances at the known point at time at which the plurality of pseudo distances are obtained at the unknown point as a plurality of pseudo distance prediction values; and calculating the position of the unknown point by a differential method using the position information of the known point, the plurality of pseudo distance prediction values, and the plurality of pseudo distances at the unknown point.

9. A computer readable recording medium on which a GPS positioning program applied to GPS positioning of determining a position of an unknown point on the basis of carrier wave phases obtained by receiving radio waves from a plurality of GPS satellites is recorded, wherein said recording medium records the GPS positioning program for causing a computer to execute the steps of:

inputting position information of a known point;

approximating the plurality of carrier wave phases obtained at the known point as approximate expressions using a time as a variable, respectively;

predicting, on the basis of the approximation expressions, the plurality of carrier wave phases at the known point at time at which the plurality of carrier wave phases are obtained at the unknown point as a plurality of carrier wave phase prediction values; and calculating the position of the unknown point by an interference positioning method using the position information of the known point, the plurality of carrier wave phase prediction values, and the plurality of carrier wave phases at the unknown point.

* * * * *